(12) United States Patent
Ono

(10) Patent No.: US 7,869,019 B2
(45) Date of Patent: Jan. 11, 2011

(54) DEVICE, METHOD, AND PROGRAM FOR ESTIMATING LIGHT SOURCE

(75) Inventor: Hiroaki Ono, Kanagawa (JP)

(73) Assignee: Sony Corporation, Tokyo (JP)

( * ) Notice: Subject to any disclaimer, the term of this patent is extended or adjusted under 35 U.S.C. 154(b) by 249 days.

(21) Appl. No.: 12/046,308

(22) Filed: Mar. 11, 2008

(65) Prior Publication Data

US 2008/0246950 A1    Oct. 9, 2008

(30) Foreign Application Priority Data

Apr. 6, 2007  (JP) ............... P2007-100885
Dec. 14, 2007  (JP) ............... P2007-322805

(51) Int. Cl.
*G01J 1/00*  (2006.01)

(52) U.S. Cl. ............... 356/213; 356/51; 356/218

(58) Field of Classification Search ......... 356/213–235; 396/225, 287, 319; 340/636, 638, 664
See application file for complete search history.

(56) References Cited

U.S. PATENT DOCUMENTS

| 4,945,418 | A | * | 7/1990 | Mutoh .................. 348/308 |
| 5,763,123 | A | * | 6/1998 | Shishido et al. ............... 430/30 |
| 6,515,275 | B1 | * | 2/2003 | Hunter et al. ............... 250/226 |
| 6,545,710 | B1 | * | 4/2003 | Kubo et al. .............. 348/223.1 |
| 7,518,715 | B1 | * | 4/2009 | Hamilton et al. ............ 356/218 |
| 2004/0119977 | A1 |  | 6/2004 | Takahashi et al. |
| 2006/0132941 | A1 | * | 6/2006 | Blank et al. ................. 359/844 |
| 2007/0258708 | A1 | * | 11/2007 | Ide .............................. 396/89 |
| 2009/0202234 | A1 | * | 8/2009 | Ichimiya ..................... 396/89 |
| 2009/0213366 | A1 | * | 8/2009 | Nakano et al. ........... 356/239.1 |
| 2009/0237799 | A1 | * | 9/2009 | Drummond et al. ......... 359/604 |

FOREIGN PATENT DOCUMENTS

JP    2004-177395    6/2004

* cited by examiner

*Primary Examiner*—Hoa Q Pham
(74) *Attorney, Agent, or Firm*—Finnegan, Henderson, Farabow, Garrett, & Dunner, L.L.P.

(57) ABSTRACT

A light source estimating device includes a light receiving section for receiving visible light and invisible light radiated from a light source, and a light source estimating section for estimating a type of the light source on the basis of an intensity of the received visible light and an intensity of the received invisible light.

12 Claims, 12 Drawing Sheets

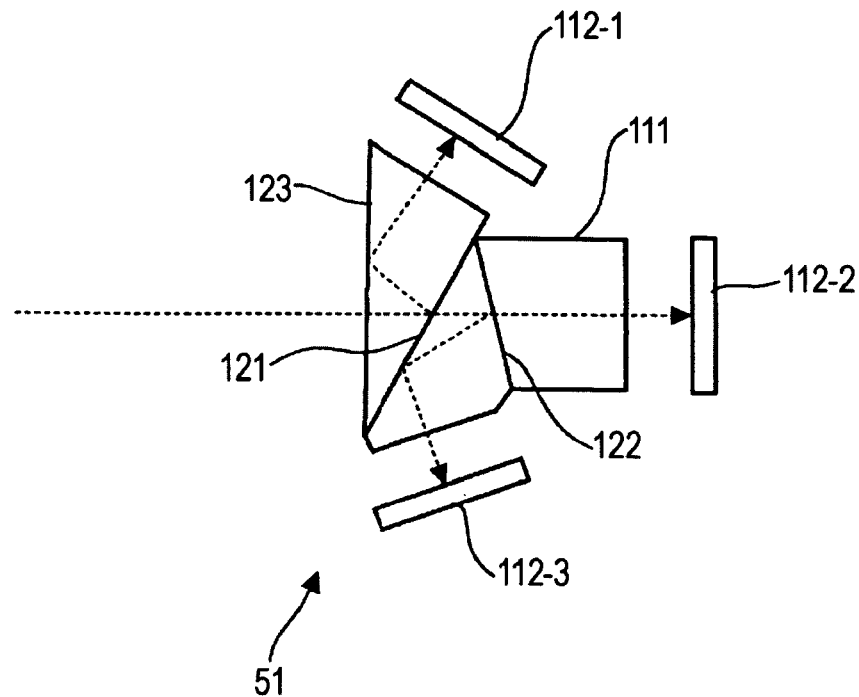

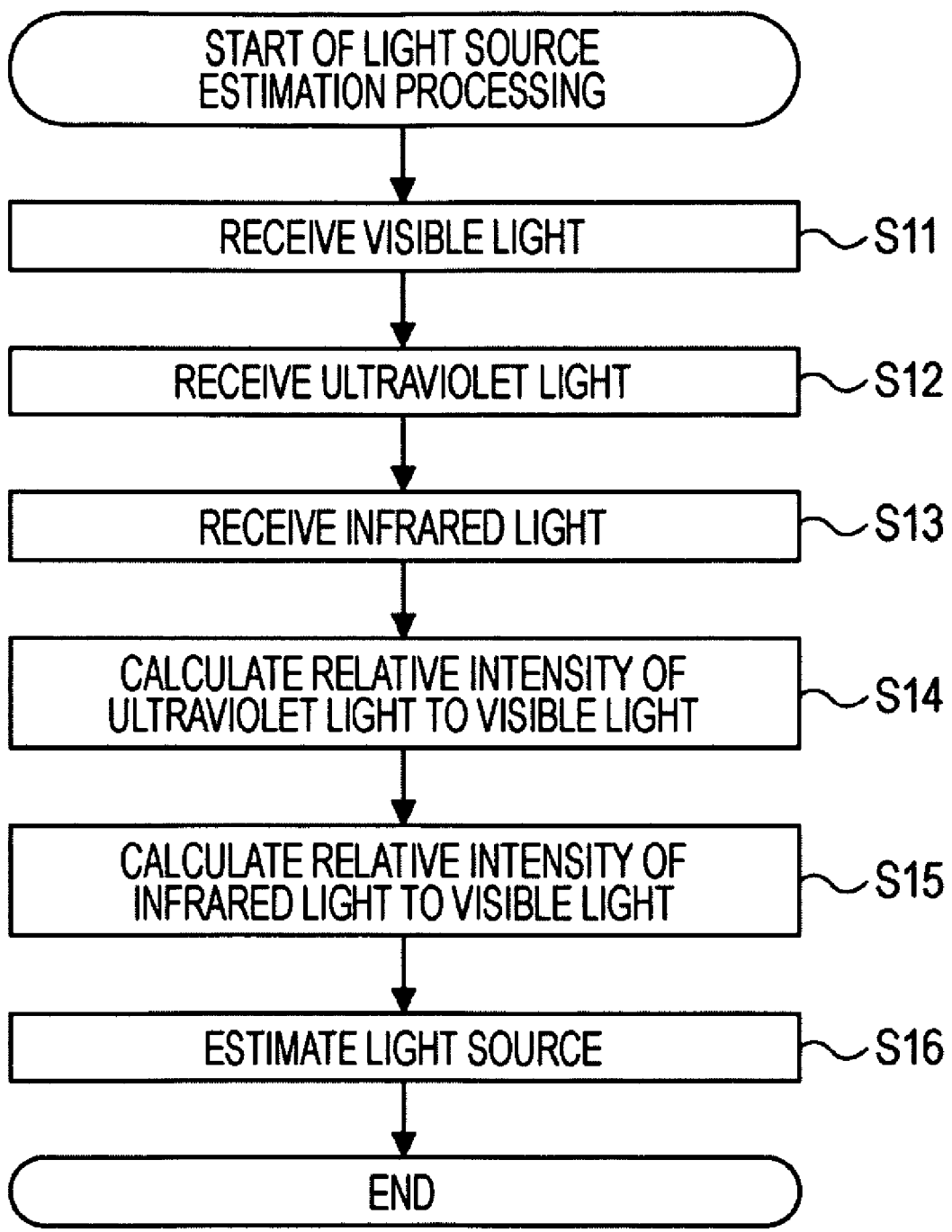

DEVICE, METHOD, AND PROGRAM FOR ESTIMATING LIGHT SOURCE

CROSS REFERENCES TO RELATED APPLICATIONS

The present invention contains subject matter related to Japanese Patent Application JP 2007-100885 filed in the Japanese Patent Office on Apr. 6, 2007, and Japanese Patent Application JP 2007-322805 filed in the Japanese Patent Office on Dec. 14, 2007, the entire contents of which are incorporated herein by reference.

BACKGROUND OF THE INVENTION

1. Field of the Invention

The invention relates to devices, methods, and programs for estimating light sources, and more particularly to a device, a method and a program for estimating a light source, capable of easily and reliably estimating the light source.

2. Description of the Related Art

In many cases, an image pickup apparatus such as a digital still camera has an automatic white balance function which appropriately controls white balance in accordance with a light source, such as the sun and a fluorescent lamp, during capturing without an instruction of a user. The image pickup apparatus having such a function estimates a light source using a pixel signal obtained through capturing with an image pickup element provided in the image pickup apparatus, and controls the white balance on the basis of a control value appropriate to the estimated light source.

Estimation of a light source during capturing typically uses pixel signals of visible light of the three primary colors, red (R), green (G), and blue (B), obtained through the capturing with the image pickup element. In particular, a value which is obtained using the pixel signals and represents the intensity of the light source is projected in an evaluation space, and then, a black-body radiation locus, predetermined characteristics of the intensity of the light source, and the like, are considered, thereby estimating a light source in a capturing environment.

However, even when light sources in the capturing environment are different, values representing the intensities of the different light sources may be projected in a region in the evaluation space which estimates the light sources as an equivalent light source. It is difficult to accurately estimate the light source. Hence, in order to reliably estimate the light source, suggestions have been made, in which the number of dimensions in the evaluation space is increased, and a new axis is added to the evaluation space to easily discriminate the different light sources.

Also, a method of estimating a light source has been suggested, in which a light source is estimated by using sensors having spectral sensitivities for colors of R, G, and B, and a fourth sensor having a spectral sensitivity for visible light having a longer wavelength than that of R (For example, see Japanese Unexamined Patent Application Publication No. 2004-177395). In this method, with the use of the fourth sensor, the accuracy of the estimation for various types of light sources including a fluorescent lamp can be increased.

SUMMARY OF THE INVENTION

However, the above-described technique has to increase the number of colors of light to be captured, or project the value representing the intensity of light in the complicated evaluation space. This may increase the cost of the image pickup apparatus, and the number of processing steps for the estimation of the light source. It is difficult to increase the accuracy of the estimation of the light source.

In light of the situation, it is desirable to easily and reliably estimate the light source.

According to an embodiment of the invention, a light source estimating device includes light receiving means for receiving visible light and invisible light radiated from a light source, and light source estimating means for estimating a type of the light source on the basis of an intensity of the received visible light and an intensity of the received invisible light.

The light receiving means may include visible light receiving means having a spectral sensitivity for visible light and receiving the visible light radiated from the light source, ultraviolet light receiving means having a spectral sensitivity for ultraviolet light and receiving ultraviolet light radiated from the light source, and infrared light receiving means having a spectral sensitivity for infrared light and receiving infrared light radiated from the light source.

The light source estimating device may further includes first relative intensity calculating means for calculating a relative intensity of the ultraviolet light to the visible light on the basis of the intensity of the received visible light and the intensity of the received ultraviolet light, and second relative intensity calculating means for calculating a relative intensity of the infrared light to the visible light on the basis of the intensity of the received visible light and the intensity of the received infrared light. The light source estimating means may estimate the type of the light source on the basis of the relative intensity calculated by the first relative intensity calculating means and the relative intensity calculated by the second relative intensity calculating means.

The light receiving means may receive light in a plurality of wavelength ranges contained in a wavelength range of visible light. The light source estimating means may estimate the type of the light source on the basis of intensities of the received light in the plurality of wavelength ranges, and the intensity of the received invisible light.

The light source estimating device may further include visible light intensity calculating means for calculating a sum of the intensities of the received light in the plurality of wavelength ranges as the intensity of the visible light, first relative intensity calculating means for calculating a relative intensity of the invisible light to the visible light on the basis of the intensity of the visible light and the intensity of the invisible light, and second relative intensity calculating means for calculating relative intensities of the light in the plurality of wavelength ranges to the visible light on the basis of the intensity of the visible light and the intensities of the light in the plurality of wavelength ranges. The light source estimating means may estimate the type of the light source on the basis of the relative intensity calculated by the first relative intensity calculating means and the relative intensities calculated by the second relative intensity calculating means.

The light source estimating device may further include normalizing means for calculating a sum of intensities of the received light in the plurality of wavelength ranges as the intensity of the visible light, and normalizing the intensities of the light in the plurality of wavelength ranges and the intensity of the invisible light on the basis of the calculated intensity of the visible light. The light source estimating means may estimate the type of the light source on the basis of the normalized intensities of the light in the plurality of wavelength ranges and the normalized intensity of the invisible light.

A light source estimating method or program includes the steps of controlling reception of visible light and invisible light radiated from a light source, and estimating a type of the light source on the basis of an intensity of the received visible light and an intensity of the received invisible light.

With an embodiment of the invention, the visible light and the invisible light radiated from the light source are received, and the type of the light source is estimated on the basis of the intensity of the received visible light and the intensity of the received invisible light.

With an embodiment of the invention, the light source can be estimated. In particular, with an embodiment of the invention, the light source can be easily and reliably estimated.

BRIEF DESCRIPTION OF THE DRAWINGS

FIG. 5 is an illustration showing another example configuration of a photoreceptor;

FIG. 6 is an explanatory view showing example filters on the surface of an image pickup element;

FIG. 7 is an explanatory view showing other example filters on the surface of the image pickup element;

FIG. 8 is a flowchart showing light source estimation processing;

DESCRIPTION OF THE PREFERRED EMBODIMENTS

Figure 1:
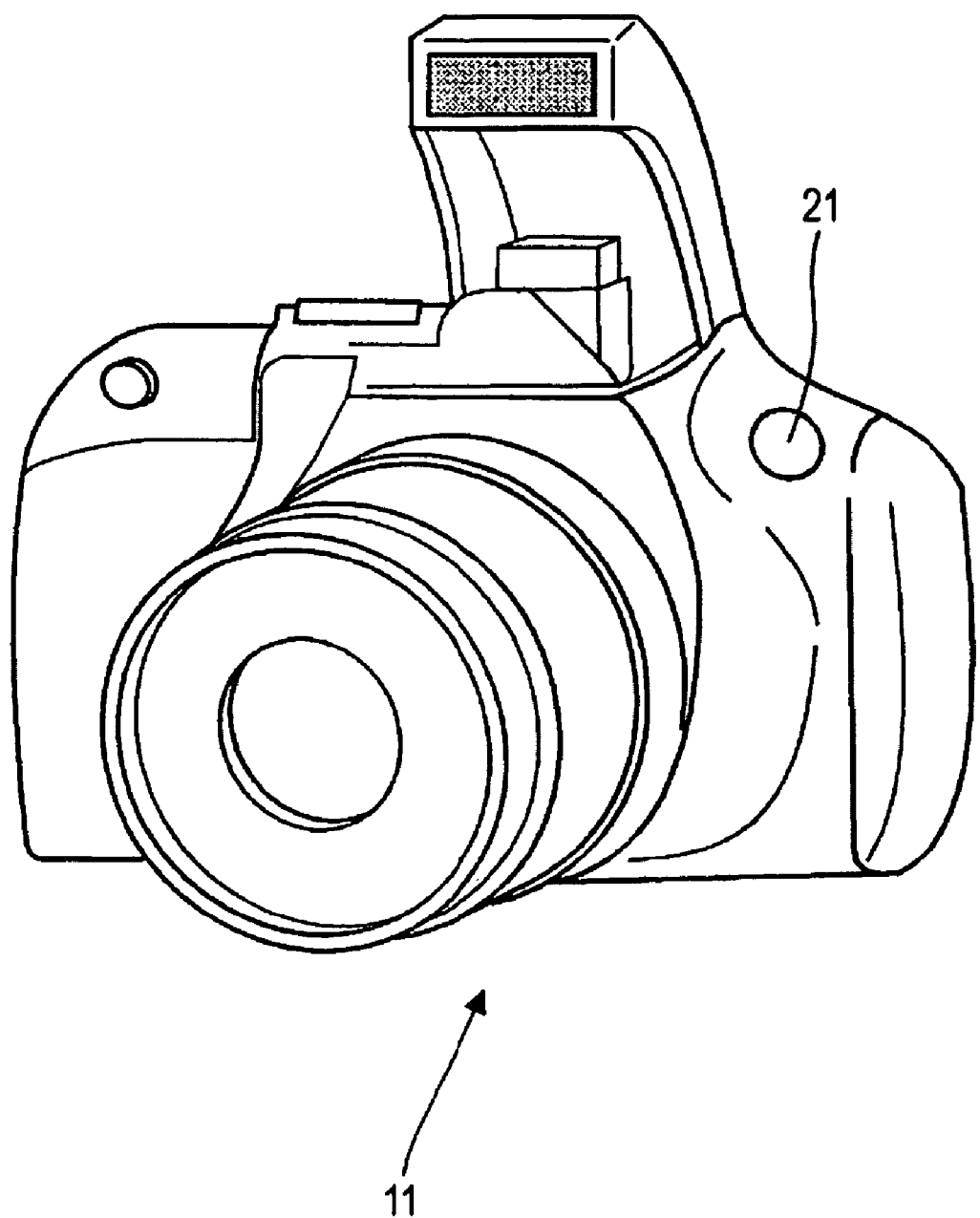
FIG. 1 is an illustration showing the appearance of an image pickup apparatus according to an embodiment adopting the invention.

Embodiments of the invention will be described below. Examples of correspondences between elements of the invention and embodiments described in the specification or the drawings are as follows. This description is to confirm that embodiments for supporting the invention are described in the specification or the drawings. Therefore, even when an embodiment described in the specification or the drawings is not described here as corresponding to the elements of the invention, this does not mean that the embodiment does not correspond to the elements. Conversely, even when an embodiment is described here as corresponding to the elements, this does not mean that the embodiment correspond only to the elements.

A light source estimating device according to an embodiment of the invention (for example, a light source estimating device 21 in FIG. 2, a light source estimating device 221 in FIG. 12, or a light source estimating device 261 in FIG. 14) includes a light receiving section (for example, a photoreceptor 51 in FIG. 2, or a photoreceptor 231 in FIG. 12 or 14) which receives visible light and invisible light radiated from a light source, and a light source estimating section (for example, a light source estimator 55 in FIG. 2, a light source estimator 237 in FIG. 12, or a light source estimator 273 in FIG. 14) which estimates a type of the light source on the basis of an intensity of the received visible light and an intensity of the received invisible light.

The light receiving section (for example, the photoreceptor 51 in FIG. 2) may include a visible light receiving section (for example, a visible light sensor 83 in FIG. 3) which has a spectral sensitivity for visible light and receives the visible light radiated from the light source, an ultraviolet light receiving section (for example, an ultraviolet sensor 82 in FIG. 3) which has a spectral sensitivity for ultraviolet light and receives ultraviolet light radiated from the light source, and an infrared light receiving section (for example, an infrared sensor 84 in FIG. 3) which has a spectral sensitivity for infrared light and receives infrared light radiated from the light source.

Figure 2:
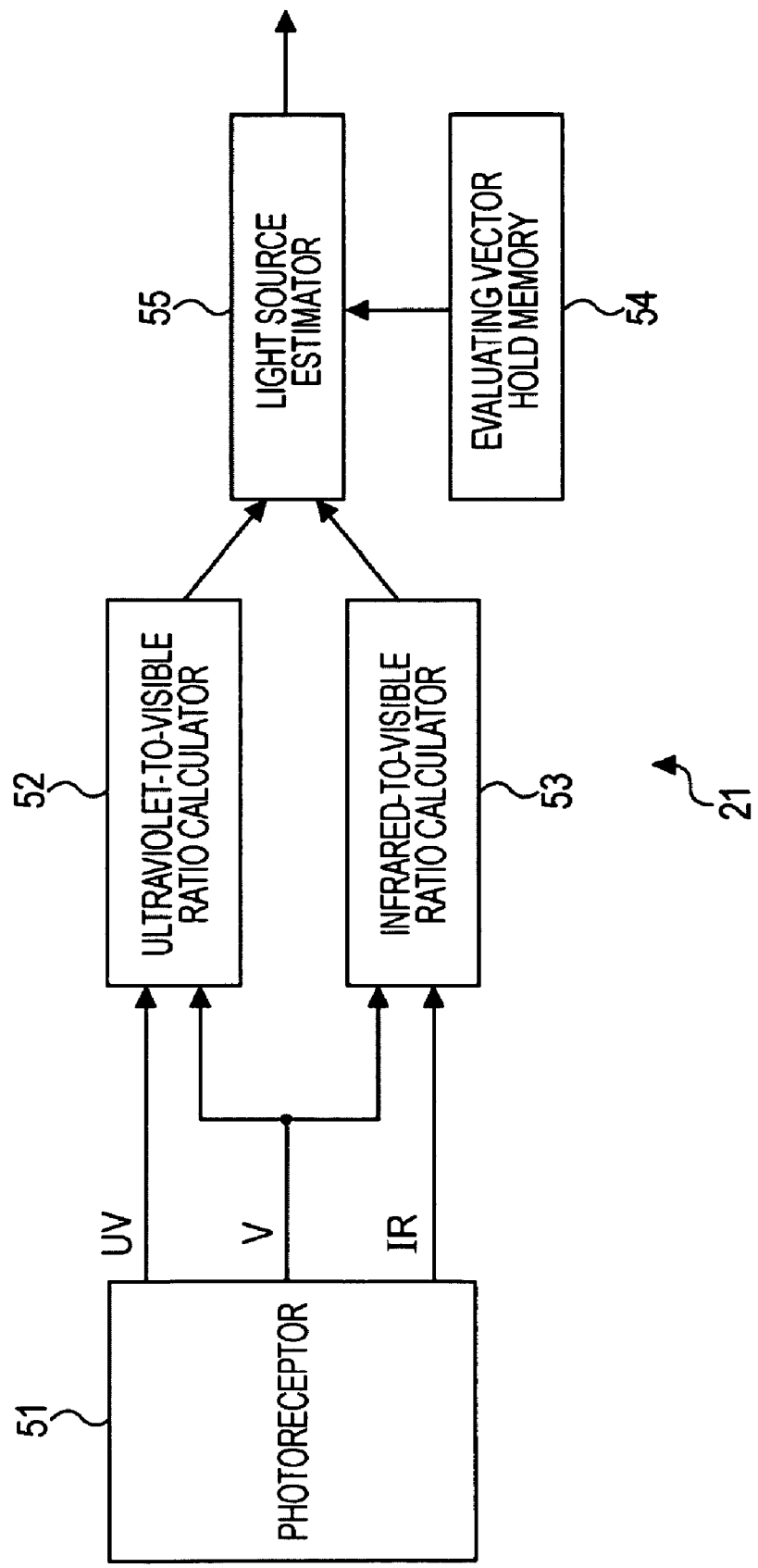
FIG. 2 is a block diagram showing an example configuration of a light source estimating device.

The light source estimating device (for example, the light source estimating device 21 in FIG. 2) may further include a first relative intensity calculating section (for example, an ultraviolet-to-visible ratio calculator 52 in FIG. 2) which calculates a relative intensity of the ultraviolet light to the visible light on the basis of the intensity of the received visible light and the intensity of the received ultraviolet light, and a second relative intensity calculating section (for example, an infrared-to-visible ratio calculator 53 in FIG. 2) which calculates a relative intensity of the infrared light to the visible light on the basis of the intensity of the received visible light and the intensity of the received infrared light. The light source estimating section may estimate the type of the light source on the basis of the relative intensity calculated by the first relative intensity calculating section and the relative intensity calculated by the second relative intensity calculating section (for example, a procedure in step S16 in FIG. 3).

Figure 13:
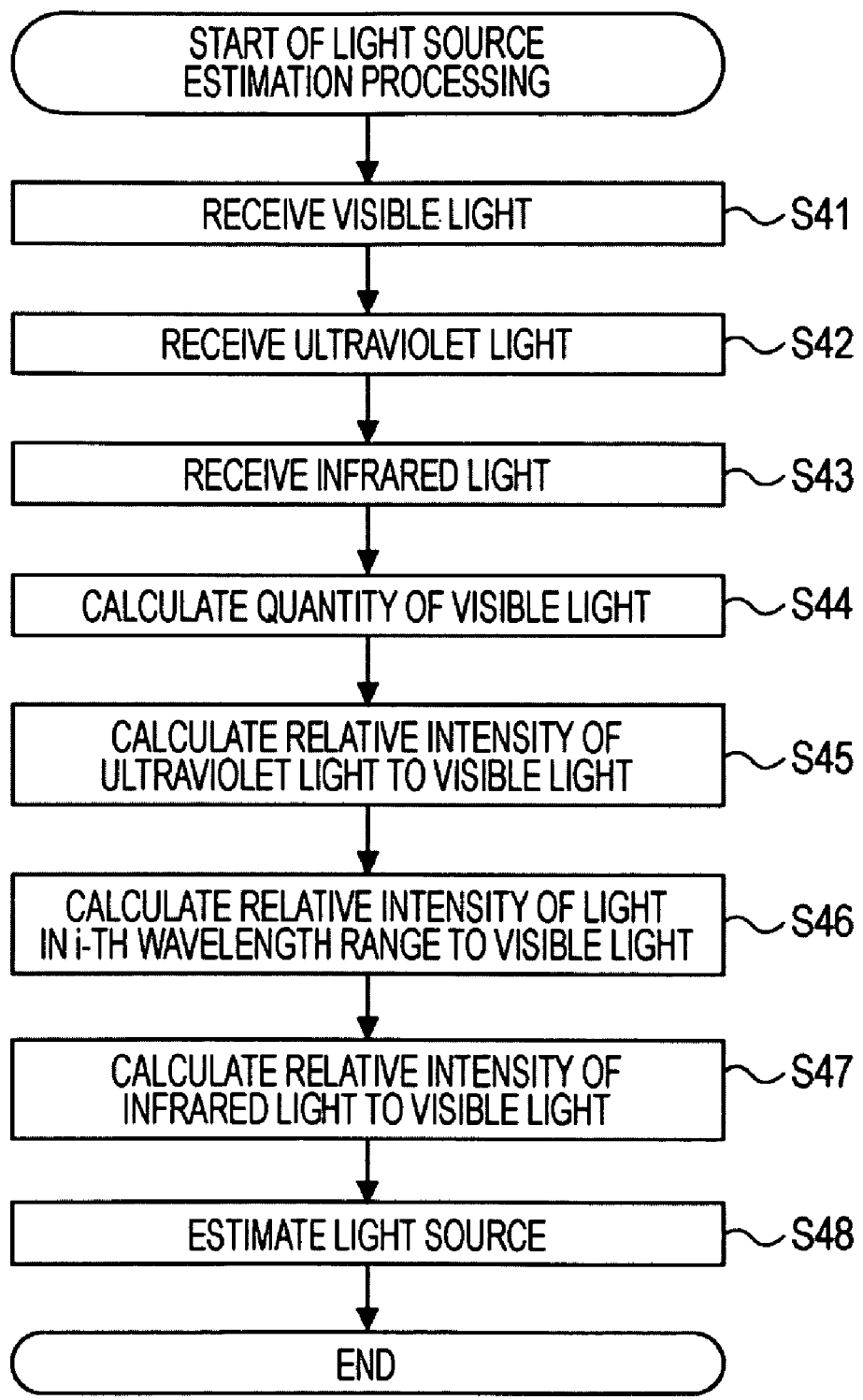
FIG. 13 is a flowchart showing light source estimation processing.
Figure 15:
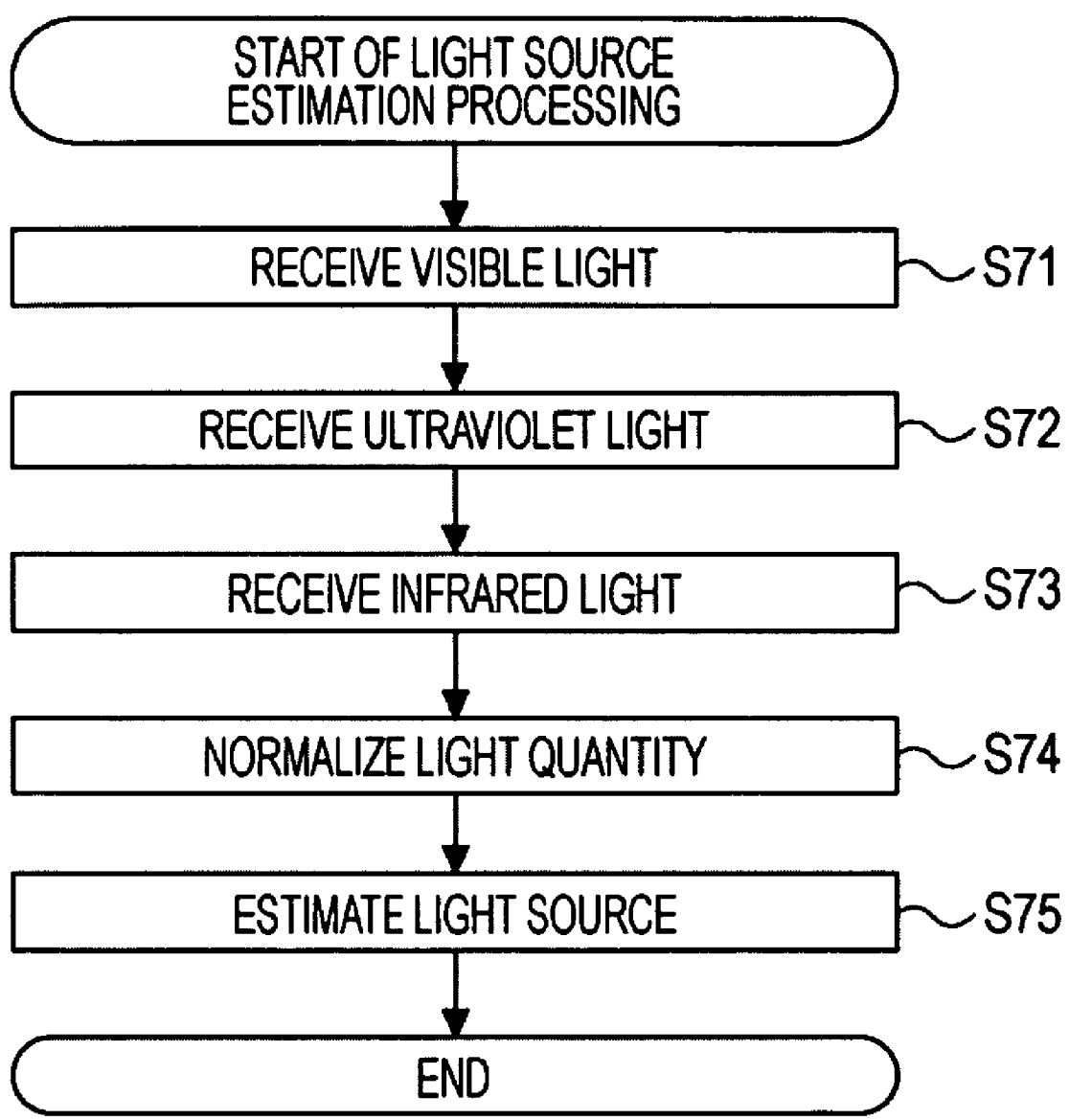
FIG. 15 is a flowchart showing light source estimation processing.

The light receiving section may receive light in a plurality of wavelength ranges contained in a wavelength range of visible light (for example, a procedure in step S41 in FIG. 13, or a procedure in step S71 in FIG. 15). The light source estimating section may estimate the type of the light source on the basis of intensities of the received light in the plurality of wavelength ranges and the intensity of the received invisible light (for example, a procedure in step S48 in FIG. 13, or a procedure in step S75 in FIG. 15).

Figure 12:
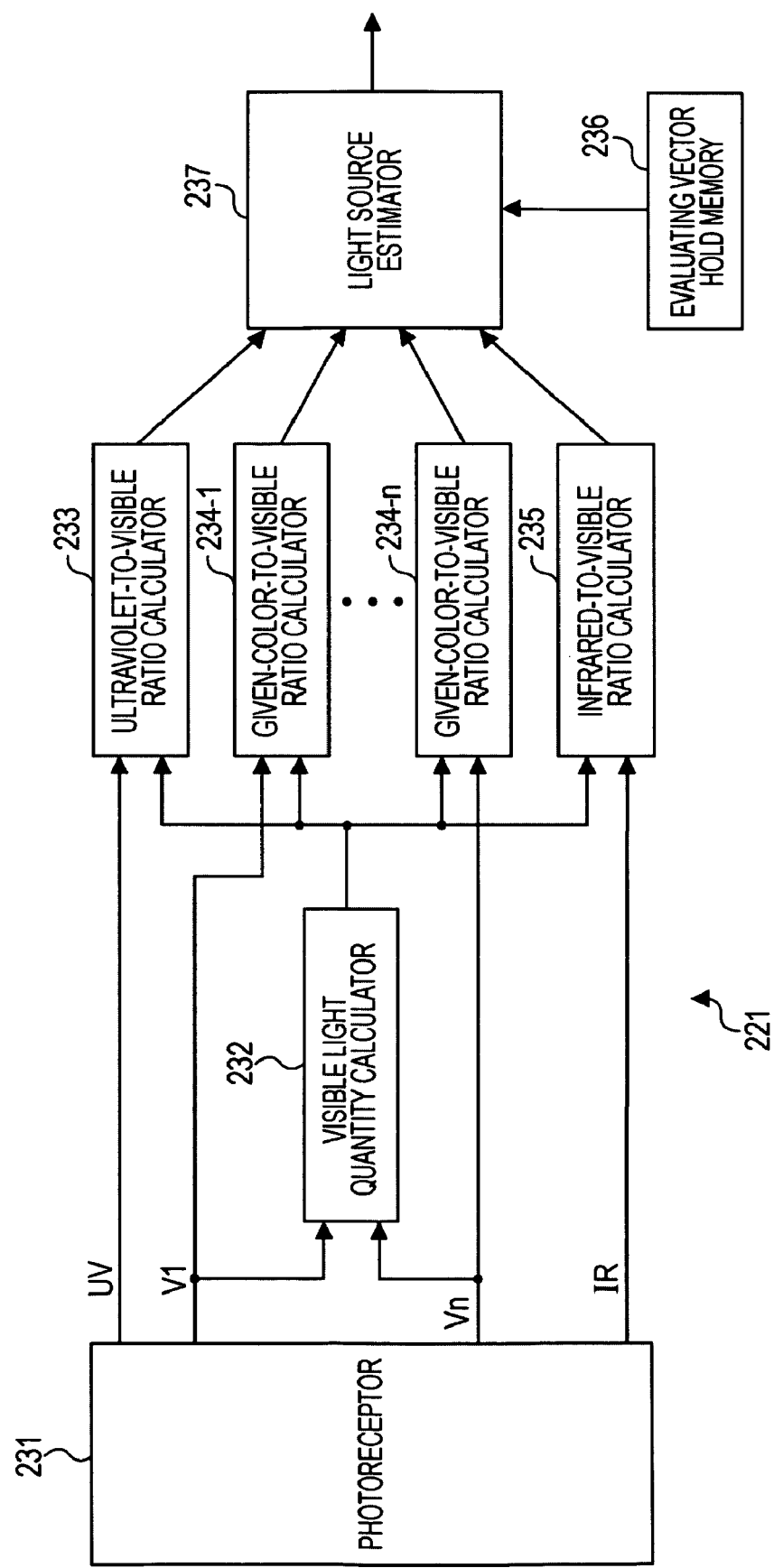
FIG. 12 is a block diagram showing another example configuration of a light source estimating device.

The light source estimating device (for example, the light source estimating device 221 in FIG. 12) may further include a visible light intensity calculating section (for example, a visible light quantity calculator 232 in FIG. 12) which calculates a sum of the intensities of the received light in the plurality of wavelength ranges as the intensity of the visible light, a first relative intensity calculating section (for example, an ultraviolet-to-visible ratio calculator 233 and an infrared-to-visible ratio calculator 235 in FIG. 12) which calculates a relative intensity of the invisible light to the visible light on the basis of the intensity of the visible light and the intensity of the invisible light, and a second relative intensity calculating section (for example, given-color-to-visible ratio calculators 234-1 to 234-$n$ in FIG. 12) which calculates relative intensities of the light in the plurality of wavelength ranges to the visible light on the basis of the intensity of the visible light and the intensities of the light in the plurality of wavelength ranges. The light source estimating section may estimate the type of the light source on the basis of the relative intensity calculated by the first relative intensity calculating means and the relative intensities calculated by the second relative intensity calculating section (for example, a procedure of step S48 in FIG. 13).

The light source estimating device (for example, the light source estimating device 261 in FIG. 14) may further include a normalizing section (for example, a normalizer 271 in FIG. 14) which calculates a sum of the intensities of the received light in the plurality of wavelength ranges as the intensity of the visible light, and normalizes the intensities of the light in the plurality of wavelength ranges and the intensity of the invisible light on the basis of the calculated intensity of the visible light. The light source estimating section may estimate the type of the light source on the basis of the normalized intensities of the light in the plurality of wavelength ranges and the normalized intensity of the invisible light (for example, a procedure in step S75 in FIG. 15).

A light source estimating method or program according to an embodiment of the invention includes the steps of controlling reception of visible light and invisible light radiated from a light source (for example, steps S11 to S13 in FIG. 8, steps S41 to S43 in FIG. 13, or steps S71 to S73 in FIG. 15), and estimating a type of the light source on the basis of an intensity of the received visible light and an intensity of the received invisible light (for example, step S16 in FIG. 8, step S48 in FIG. 13, or step S75 in FIG. 15).

Hereinafter, embodiments adopting the invention are described below with reference to the drawings.

FIG. 1 is an illustration showing the appearance of an image pickup apparatus according to an embodiment adopting the invention.

An image pickup apparatus 11 is, for example, a digital still camera, which captures an image of an object through an operation of a user. Also, a light source estimating device 21 is provided at an upper right portion of the image pickup apparatus 11 in the drawing. The light source estimating device 21 estimates a light source of light emitted on an object to be captured.

The light source estimating device 21 receives the light radiated from the light source, and estimates the type of the light source on the basis of the quantity (intensity) of the received light. In particular, the light source estimating device 21 estimates the light source in a capturing environment from among various types of light sources, such as the sun, a fluorescent lamp, an incandescent lamp, and a light emitting diode (LED), on the basis of the quantity of the received light. The image pickup apparatus 11 controls various parameters as desired, such as white balance, during capturing of an image on the basis of the estimated result of the light source with the light source estimating device 21.

Regardless of whether the capturing environment of the image pickup apparatus 11 is outdoor or indoor, the light source is typically expected to be located above the image pickup apparatus 11, or at a position vertically upwardly opposite thereto. Hence, to receive a larger quantity of light, the light source estimating device 21 is provided at an upper portion of the image pickup apparatus 11 to face upward. The light source estimating device 21, however, does not have to be provided at the upper portion of the image pickup apparatus 11, and may be provided at other position.

FIG. 2 is a block diagram showing an example configuration of the light source estimating device 21 in FIG. 1.

The light source estimating device 21 includes a photoreceptor 51, an ultraviolet-to-visible ratio calculator 52, an infrared-to-visible ratio calculator 53, an evaluating vector hold memory 54, and a light source estimator 55.

The photoreceptor 51 is a plurality of sensors containing, for example, a sensor having a spectral sensitivity for visible light, a sensor having a spectral sensitivity for invisible light (non-visible light), and the like. The photoreceptor 51 receives light radiated from the light source. In particular, the photoreceptor 51 includes a sensor having a spectral sensitivity for ultraviolet light, a sensor having a spectral sensitivity for visible light, and a sensor having a spectral sensitivity for infrared light. Herein, having a spectral sensitivity means that a sensor has a sensitivity sufficient for measuring the quantity of light with a predetermined wavelength.

The photoreceptor 51 receives the ultraviolet light, the infrared light, and the visible light radiated from the light source, and converts the ultraviolet light, the infrared light, and the visible light into electric signals which respectively represent the light quantities thereof. That is, the photoreceptor 51 photoelectrically converts the received light, and obtains an ultraviolet light quantity (intensity) UV, a visible light quantity (intensity) V, and an infrared light quantity (intensity) IR. The photoreceptor 51 supplies the ultraviolet-to-visible ratio calculator 52 with the light quantity UV and the light quantity V obtained through the photoelectric conversion, and supplies the infrared-to-visible ratio calculator 53 with the light quantity V and the light quantity IR obtained through the photoelectric conversion.

The ultraviolet-to-visible ratio calculator 52 calculates a ratio of the ultraviolet light quantity UV to the visible light quantity V, that is, a relative intensity (relative light quantity) of the ultraviolet light to the visible light, and supplies the light source estimator 55 with the calculated value.

The infrared-to-visible ratio calculator 53 calculates a ratio of the infrared light quantity IR to the visible light quantity V, that is, a relative intensity (relative light quantity) of the infrared light to the visible light, and supplies the light source estimator 55 with the calculated value.

The evaluating vector hold memory 54 has an evaluating vector, which is composed of a relative intensity of ultraviolet light to visible light, and a relative intensity of infrared light to visible light, predetermined for a plurality of light sources.

For example, if the light source is the sun, an evaluating vector of the sun is predetermined on the basis of a ratio of an ultraviolet light quantity UV to a visible light quantity V received by the photoreceptor 51, and a ratio of an infrared light quantity IR to the visible light quantity V received by the photoreceptor 51. Also, an evaluating vector of another light source is predetermined. The evaluating vector hold memory 54 stores the evaluating vectors. The evaluating vector hold memory 54 has such an evaluating vector thus obtained for each light source, and supplies the light source estimator 55 with the stored evaluating vector as desired.

The light source estimator 55 uses the evaluating vector stored in the evaluating vector hold memory 54, and a vector to be evaluated, which is a vector composed of the relative intensity of the ultraviolet light to the visible light supplied from the ultraviolet-to-visible ratio calculator 52 and the relative intensity of the infrared light to the visible light supplied from the infrared-to-visible ratio calculator 53, to estimate the (type of) light source, and output the estimated result to the image pickup apparatus 11.

Figure 3:
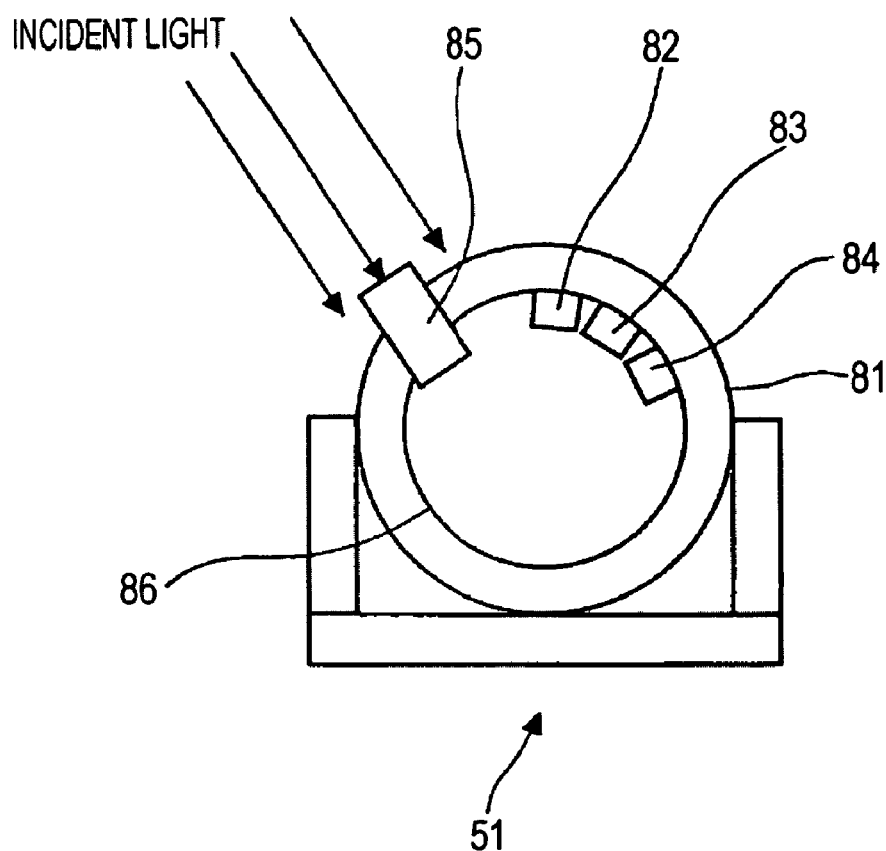
FIG. 3 is an illustration showing a detailed example configuration of a photoreceptor.

For example, as shown in FIG. 3, the photoreceptor 51 includes a hollow integrating sphere 81, an ultraviolet sensor 82, a visible light sensor 83, and an infrared sensor 84, the sensors being provided in the integrating sphere 81.

The integrating sphere 81 has an opening 85 that allows light from the light source to enter the inner space of the integrating sphere 81. The integrating sphere 81 has a spherical space therein, and a diffuse reflecting plate 86 is provided on a surface defining the inner space of the integrating sphere 81, i.e., the diffuse reflecting plate 86 is provided on the inner surface of the integrating sphere 81. The three sensors 82 to 84 are disposed on the inner surface of the integrating sphere 81.

The diffuse reflecting plate 86 diffuses and reflects the light radiated from the light source through the opening 85. As described above, since the inner space of the integrating sphere 81 has a spherical shape and the diffuse reflecting plate 86 diffuses the incident light, the light from the light source can be diffused and evenly incident on the sensors 82 to 84. That is, the sensors 82 to 84 can receive the incident light in a wide range.

The ultraviolet sensor 82 receives and photoelectrically converts the ultraviolet light from among the light emitted into the inner space of the integrating sphere 81 and diffused and reflected by the diffuse reflecting plate 86. The ultraviolet sensor 82 has a spectral sensitivity for ultraviolet light, thereby receiving and photoelectrically converting only the light in a wavelength range of the ultraviolet light, obtaining the ultraviolet light quantity UV, and outputting the light quantity UV.

The visible light sensor 83 receives and photoelectrically converts the visible light from among the light emitted into the inner space of the integrating sphere 81 and diffused and reflected by the diffuse reflecting plate 86. The visible light sensor 83 has a spectral sensitivity for visible light, thereby receiving and photoelectrically converting only the light in a wavelength range of the visible light, obtaining the visible light quantity V, and outputting the light quantity V.

The infrared sensor 84 receives and photoelectrically converts the infrared light from among the light emitted into the inner space of the integrating sphere 81 and diffused and reflected by the diffuse reflecting plate 86. The infrared sensor 84 has a spectral sensitivity for infrared light, thereby receiving and photoelectrically converting only the light in a wavelength range of the infrared light, obtaining the infrared light quantity IR, and outputting the light quantity IR.

In the example of FIG. 3, since merely the integrating sphere 81 and the three sensors 82 to 84 constitute the photoreceptor 51, the photoreceptor 51 may have a simple configuration, and may be small.

Figure 4:
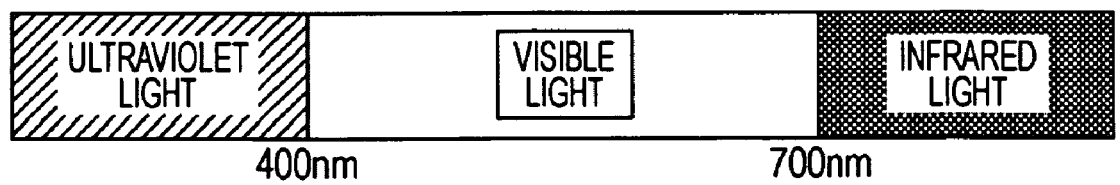
FIG. 4 is an illustration showing classification of light with wavelengths.

It is assumed that the ultraviolet light, the visible light, and the infrared light are light in predetermined wavelength ranges, for example, as shown in FIG. 4. In particular, it is assumed that light with wavelengths of 400 nm or smaller is ultraviolet light, light with wavelengths between 400 and 700 nm is visible light, and light with wavelengths of 700 nm or greater is infrared light.

To be more specific, a spectral reflectance of the diffuse reflecting plate 86, that is, a reflectance of light with each wavelength range is predetermined. Also, a spectral characteristic of each of the sensors 82 to 84 is predetermined. The spectral characteristic represents a light quantity obtained through the photoelectric conversion for a light quantity of incident light with each wavelength. The sensors 82 to 84 obtain more accurate quantities of the ultraviolet light, the visible light, and the infrared light emitted into the integrating sphere 81 on the basis of the spectral characteristics of the sensors 82 to 84 and the spectral reflectance of the diffuse reflecting plate 86, and outputs the obtained results.

As shown in FIG. 5, the photoreceptor 51 may include image pickup elements, such as charge coupled devices (CCD), and complementary metal oxide semiconductors (CMOS). In FIG. 5, a dotted arrow indicates the loci of the light radiated from the light source and incident on the photoreceptor 51.

In the example of FIG. 5, the photoreceptor 51 includes a prism 111, and image pickup elements 112-1, 112-2, and 112-3.

The prism 111 is, for example, a complex prism composed of three bonded prisms. The prism 111 has interfaces 121 and 122 between the bonded prisms. The prism 111 separates the light radiated from the light source and incident on the prism 111 into infrared light, visible light, and ultraviolet light, and allows the separated infrared light, visible light, and ultraviolet light to be incident on the image pickup elements 112-1, 112-2, and 112-3, respectively.

In particular, the light radiated from the light source and incident on an incidence surface 123 of the prism 111 provided on the left side in the drawing passes through the incidence surface 123 and is incident on the interface 121. An infrared component of the light incident on the interface 121, that is, the infrared light is reflected by the interface 121, whereas the light excluding the infrared light passes through the interface 121 and is incident on the interface 122.

The infrared light reflected by the interface 121 is reflected by the incidence surface 123, and is incident on the image pickup element 112-1. An ultraviolet component of the light passing through the interface 121 and incident on the interface 122, that is, the ultraviolet light is reflected by the interface 122, and the light excluding the ultraviolet light passes through the interface 122 and is incident on the image pickup element 112-2. Accordingly, the light from the light source excluding the infrared component and the ultraviolet component, that is, the visible light is incident on the image pickup element 112-2. The ultraviolet light reflected by the interface 122 is reflected by the interface 121, and is incident on the image pickup element 112-3.

The image pickup elements 112-1 to 112-3 may be CCD or CMOS, and have spectral sensitivities for the infrared light, the visible light, and the ultraviolet light, respectively. The image pickup elements 112-1 to 112-3 receive the infrared light incident on the prism 111 and separated at the interface 121, the visible light passing through the prism 111, and the ultraviolet light separated at the interface 122, respectively. Then, the image pickup elements 112-1 to 112-3 photoelectrically convert the received light to obtain the light quantities IR, V, and UV, and output the obtained results.

Hereinafter, when the image pickup elements 112-1 to 112-3 do not have to be distinguished from each other, each image pickup element is merely referred to as an image pickup element 112.

Filters are provided on the surface of the image pickup element 112. Each filter allows light of a predetermined color, or light in a predetermined wavelength range to be incident on an acceptance surface of the image pickup element 112.

For example, as shown in FIG. 6A, filters only transmitting infrared light are provided on the surface of the image pickup element 112-1 for individual pixels. In FIG. 6A, a rectangle corresponds to a pixel. The image pickup element 112-1 receives the infrared light incident on the individual pixels through the filters, photoelectrically converts the light, thereby obtaining the light quantities for the individual pixels, calculates a mean value of the light quantities, and outputs the mean value as the light quantity IR. In other words, the image pickup element 112-1 captures the infrared light incident on the individual pixels, and outputs a mean value of luminance values of the individual pixels obtained through the capturing, as the infrared light quantity IR.

For example, as shown in FIG. 6B, filters only transmitting visible light of red (R), green (G), and blue (B) colors are provided on the surface of the image pickup element 112-2 for individual pixels. In FIG. 6B, a rectangle corresponds to a pixel.

The filters provided on the surface of the image pickup element 112-2 include filters only transmitting R color light (light with wavelengths of R color), filters only transmitting G color light (light with wavelengths of G color), and filters only transmitting B color light (light with wavelengths of B color). The color pattern of the filters is Bayer pattern. In particular, on the surface of the image pickup element 112-2, the G color filters are arranged in a checkered pattern, and the R color filters and the B color filters are arranged in the residual portions in alternate columns.

The image pickup element 112-2 receives the R, G, and B color light as the visible light incident on the individual pixels through the filters, photoelectrically converts the light, obtains the light quantities for the individual pixels, i.e., the light quantity V of the incident visible light, and outputs the light quantity V. That is, the image pickup element 112-2 captures the R, G, and B color light incident on the individual pixels. The image pickup element 112-2 calculates a mean value of each color, then calculates a mean value of the calculated mean values of the individual colors, and outputs the mean value, as the light quantity V. In particular, the image pickup element 112-2 obtains a mean value of luminance values for the R color pixels, a mean value of luminance values for the G color pixels, and a mean value of luminance values for the B color pixels. Then, the image pickup element 112-2 obtains a mean value of the obtained mean values of the luminance values, as the visible light quantity V.

For example, as shown in FIG. 6C, filters only transmitting ultraviolet light are provided on the surface of the image pickup element 112-3 in FIG. 5 for individual pixels. In FIG. 6C, a rectangle corresponds to a pixel. The image pickup element 112-3 receives the ultraviolet light incident on the individual pixels through the filters, photoelectrically converts the light, thereby obtaining the light quantities for the individual pixels, calculates a mean value of the light quantities, and outputs the mean value as the light quantity UV. In other words, the image pickup element 112-3 captures the ultraviolet light incident on the individual pixels, and outputs a mean value of luminance values of the individual pixels obtained through the capturing, as the light quantity UV.

Alternatively, the calculating method of the light quantities IR, V, and UV may be as follows. The image pickup element 112-1 captures the infrared light incident on the individual pixels, and outputs the sum total of the luminance values of the individual pixels obtained through the capturing, as the infrared light quantity IR. The image pickup element 112-3 captures the ultraviolet light incident on the individual pixels, and outputs the sum total of the luminance values of the individual pixels obtained through the capturing, as the ultraviolet light quantity UV. The image pickup element 112-2 uses information of luminance values of one of R, G, and B colors incident on the individual pixels, performs demosaic processing to calculate a luminance value of all colors (R, G, and B) for each pixel, and to obtain the sum total of luminance values of all colors for all pixels, as the light quantity V. In this case, the image obtained through the demosaic processing (image in which each pixel has all colors) may be directly used as a captured image with a typical RGB form.

As described above, the filters only transmitting light in predetermined wavelength ranges are provided on the surface of the image pickup element 112. The image pickup element 112 receives the incident light and obtains the quantity of light.

Still alternatively, the image pickup elements 112-1 to 112-3 may be used for estimating the light source, and also, the image pickup element 112-2 may be used for capturing an image of an object. In such a case, an image captured by the image pickup element 112-2 serves as an image of an object, and images captured by the image pickup elements 112-1 to 112-3 are used for estimating the light source.

In the photoreceptor 51 in FIG. 5, while the three image pickup elements 112 are used to obtain the light quantities of the infrared light, the visible light, and the ultraviolet light, only two image pickup elements may be used.

For example, the image pickup elements 112-1 and 112-2 may be used. As shown in FIG. 7A, the red (R), green (G), and blue (B) filters may be arranged on the surface of the image pickup element 112-2 with the Bayer pattern. In FIG. 7A, a rectangle corresponds to a pixel.

Similarly to the example in FIG. 6B, the image pickup element 112-2 captures the R, G, and B color light as the visible light incident on the individual pixels through the filters, thereby obtaining luminance values for the individual pixels, calculates a mean value of the luminance values for each color, then calculates a mean value of the calculated mean values of the individual colors, and outputs the mean value, as the light quantity V.

If only the image pickup elements 112-1 and 112-2 are used, the image pickup element 112-1 may receive the ultraviolet light and the infrared light. Hence, the invisible light, or the ultraviolet light, and the infrared light are reflected by the interface 121 in FIG. 5, and incident on the image pickup element 112-1.

For example, as shown in FIG. 7B, filters only transmitting the ultraviolet light and the infrared light are provided on the surface of the image pickup element 112-1 for individual pixels. In FIG. 7B, a rectangle corresponds to a pixel. On the surface of the image pickup element 112-1, filters only transmitting the ultraviolet light are arranged in a checkered pattern, and filters only transmitting the infrared light are arranged in the residual portions.

The image pickup element 112-1 captures the ultraviolet light and the infrared light as the invisible light incident on the individual pixels through the filters, thereby obtaining luminance values of the ultraviolet light and those of the infrared light for the pixels, outputs a mean value of the luminance values of the ultraviolet light as the ultraviolet light quantity UV, and outputs a mean value of the luminance values of the infrared light as the infrared light quantity IR.

As described above, if only the two image pickup elements 112 are used, the number of pixels of the infrared light and the ultraviolet light decrease as compared with the case in which the three image pickup elements are used. Hence, although the available amount of information decreases, the number of image pickup elements 112 used for the light source estimation can decrease, thereby reducing the size and the cost of the light source estimating device 21.

Further alternatively, filters only transmitting the visible light, filters only transmitting the ultraviolet light, and filters only transmitting the infrared light may be arranged on a single image pickup element 112, so that the visible light quantity V, the ultraviolet light quantity UV, and the infrared light quantity IR can be obtained by the single image pickup element 112.

Also, in the above description, the photoreceptor 51 may have the configuration in FIG. 3, or the configuration in FIG.

5. Hereinafter, it is assumed that the photoreceptor 51 in FIG. 2 has a similar configuration to FIG. 3.

The image pickup apparatus 11 instructs the light source estimating device 21 to estimate the light source in the capturing environment of the image pickup apparatus 11 during the capturing of an image of an object. In response to the instruction of the image pickup apparatus 11, the light source estimating device 21 starts light source estimation processing for estimating the light source.

Referring to a flowchart in FIG. 8, the light source estimation processing with the light source estimating device 21 is described below.

In step S11, the photoreceptor 51 receives the visible light radiated from the light source and incident on the photoreceptor 51. In particular, the visible light sensor 83 of the photoreceptor 51 receives the visible light, which is incident through the opening 85 and diffused and reflected by the diffuse reflecting plate 86, and photoelectrically converts the visible light. The visible light sensor 83 supplies the ultraviolet-to-visible ratio calculator 52 and the infrared-to-visible ratio calculator 53 with the visible light quantity V obtained through the photoelectric conversion.

In step S12, the photoreceptor 51 receives the ultraviolet light radiated from the light source and incident on the photoreceptor 51. In particular, the ultraviolet sensor 82 of the photoreceptor 51 receives the ultraviolet light, which is incident through the opening 85 and diffused and reflected by the diffuse reflecting plate 86, and photoelectrically converts the ultraviolet light. The ultraviolet sensor 82 supplies the ultraviolet-to-visible ratio calculator 52 with the ultraviolet light quantity UV obtained through the photoelectric conversion.

In step S13, the photoreceptor 51 receives the infrared light radiated from the light source and incident on the photoreceptor 51. In particular, the infrared sensor 84 of the photoreceptor 51 receives the infrared light, which is incident through the opening 85 and diffused and reflected by the diffuse reflecting plate 86, and photoelectrically converts the infrared light. The infrared sensor 84 supplies the infrared-to-visible ratio calculator 53 with the infrared light quantity IR obtained through the photoelectric conversion.

To be more specific, the procedures in steps S11 to S13 are simultaneously performed by the photoreceptor 51.

In step S14, the ultraviolet-to-visible ratio calculator 52 calculates a relative intensity P1 of the ultraviolet light to the visible light on the basis of the light quantity UV and the light quantity V supplied from the photoreceptor 51, and supplies the light source estimator 55 with the calculated relative intensity P1. For example, the ultraviolet-to-visible ratio calculator 52 calculates the relative intensity P1 by the following equation (1):

$$P1=UV/V \qquad (1),$$

where, in the equation (1), UV is the ultraviolet light quantity UV, and V is the visible light quantity V. Thus, the relative intensity P1 is obtained by dividing the light quantity UV by the light quantity V.

In step S15, the infrared-to-visible ratio calculator 53 calculates a relative intensity P2 of the infrared light to the visible light on the basis of the light quantity IR and the light quantity V supplied from the photoreceptor 51, and supplies the light source estimator 55 with the calculated relative intensity P2. For example, the infrared-to-visible ratio calculator 53 calculates the relative intensity P2 by the following equation (2):

$$P2=IR/V \qquad (2),$$

where, in the equation (2), IR is the infrared light quantity IR, and V is the visible light quantity V. Thus, the relative intensity P2 is obtained by dividing the light quantity IR by the light quantity V.

In step S16, the light source estimator 55 uses a vector to be evaluated, which is composed of the relative intensity P1 supplied from the ultraviolet-to-visible ratio calculator 52 and the relative intensity P2 supplied from the infrared-to-visible ratio calculator 53, and an evaluating vector, which is stored in the evaluating vector hold memory 54, to estimate the light source. The light source estimator 55 outputs the estimated result, and then the light source estimation processing is completed.

For example, the light source estimator 55 calculates a similarity between the vector to be evaluated and the evaluating vector for each light source, and selects the evaluating vector having the highest similarity, that is, the evaluating vector which is the most similar to the vector to be evaluated. Then, the light source estimator 55 estimates the light source indicated with the selected evaluating vector as the light source obtained on the basis of the result of the light source estimation. The light source estimator 55 outputs information indicating the light source to the image pickup apparatus 11.

The light source in the capturing environment of the image pickup apparatus 11 may typically include various types of light sources, such as the sun, a fluorescent lamp, and an incandescent lamp. Such a light source has own spectral distribution.

Figure 9:
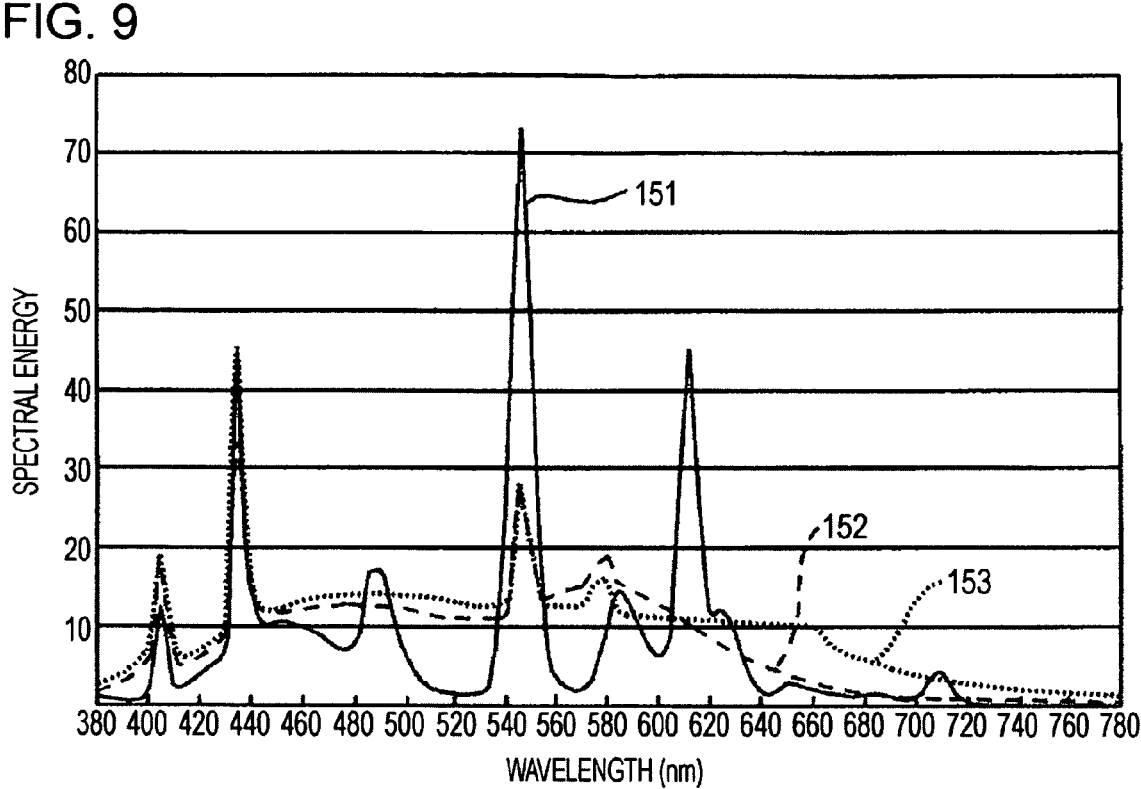
FIG. 9 is a chart showing a spectral distribution of light of a fluorescent lamp.

For example, as shown in FIG. 9, the light of a fluorescent lamp as a light source contains a large quantity of visible light component, but contains only small quantities of ultraviolet and infrared components. In FIG. 9, the vertical axis plots spectral energy and the horizontal axis plots wavelength.

A curve 151 corresponding to F10, which is a segment name according to the provisions of Japan Industrial Standard (JIS), indicates a spectral distribution of a three band fluorescent lamp. The curve 151 has some peaks, for example, at wavelengths of 440, 550, and 615 nm. The light of the fluorescent lamp indicated by the curve 151 mainly contains light in a wavelength range from 400 to 720 nm.

A curve 152 corresponding to F1, which is a segment name according to the provisions of JIS, indicates a spectral distribution of a standard fluorescent lamp. The curve 152 has peaks near wavelengths of 440 and 580 nm. The light of the fluorescent lamp indicated by the curve 152 mainly contains light in a wavelength range from 440 to 640 nm. The spectral energy in the wavelength range is substantially uniform.

A curve 153 corresponding to F7, which is a segment name according to the provisions of JIS, indicates a spectral distribution of a high color-rendering fluorescent lamp. The curve 153 has peaks near wavelengths of 440 and 580 nm. The light of the fluorescent lamp indicated by the curve 153 mainly contains light in a wavelength range from 440 to 660 nm. The spectral energy in the wavelength range is substantially uniform.

As described above, the light of a fluorescent lamp contains a large quantity of visible light component, but contains only small quantities of ultraviolet and infrared components.

Figure 10:
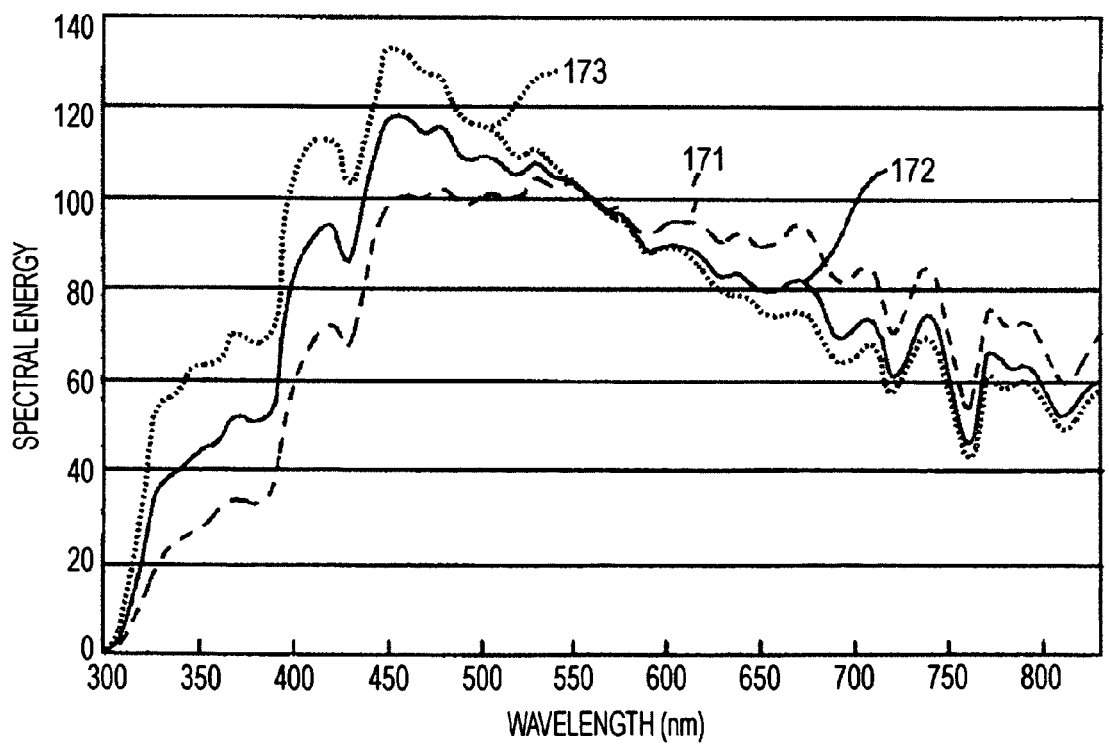
FIG. 10 is a chart showing a spectral distribution of sunlight.

For example, as shown in FIG. 10, sunlight contains a large quantity of visible light component, and certain quantities of ultraviolet and infrared components. In FIG. 10, the vertical axis plots spectral energy and the horizontal axis plots wavelength.

Curves 171 to 173 indicate spectral distributions of sunlight at color temperatures of 5500K, 6500K, and 7500K. The curves 171 to 173 relatively smoothly vary, and the degree of the spectral energies do not rapidly vary with wavelengths.

Sunlight indicated by the curves 171 to 173 contains a large quantity of visible light, as well as ultraviolet light and infrared light. In particular, sunlight contains more infrared light than ultraviolet light.

As described above, sunlight contains a large quantity of visible light component, and certain quantities of ultraviolet and infrared components.

Figure 11:
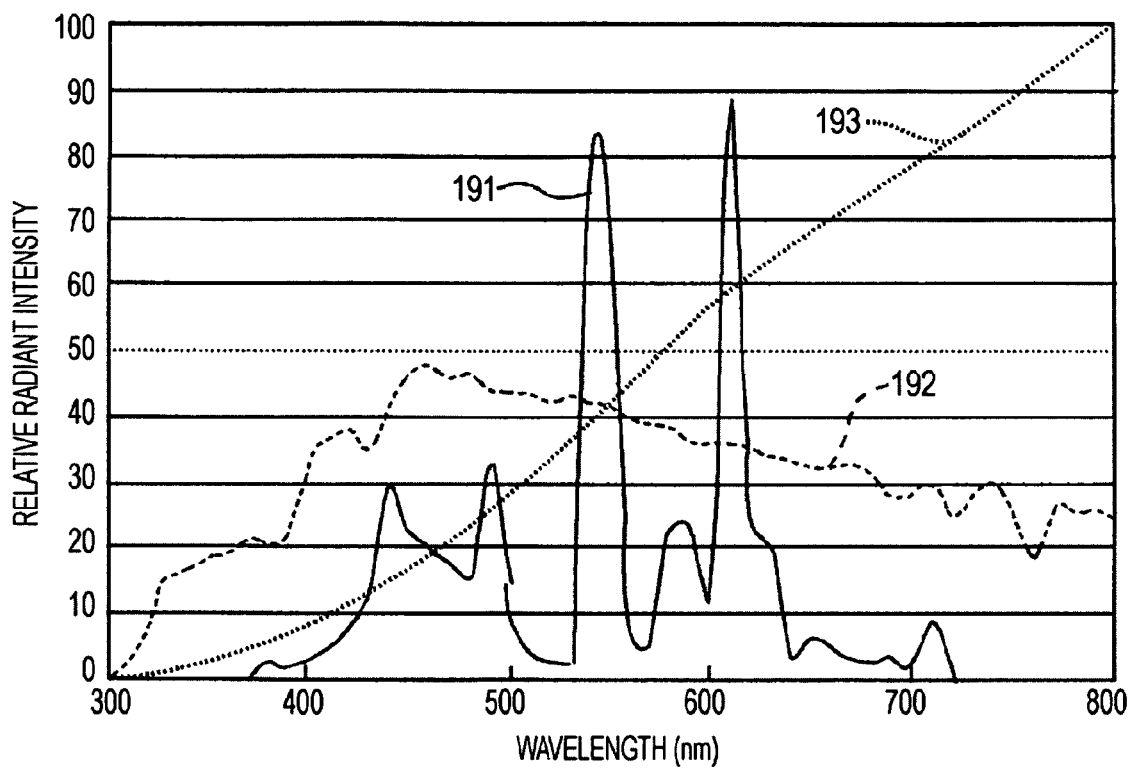
FIG. 11 is a chart showing spectral distributions of light of light sources.

When comparing the components of ultraviolet light, visible light, and infrared light for the light sources, the light sources have own properties. Hence, the light source can be reliably estimated by concerning the infrared light component, the visible light component, and the ultraviolet light component. For example, as shown in FIG. 11, since light of a fluorescent lamp, sunlight, and light of an incandescent lamp have different relative intensities of infrared light and ultraviolet light to visible light, the light source can be easily estimated by using the relative intensities. In FIG. 11, the vertical axis plots relative radiant intensity of the light radiated from the light source and the horizontal axis plots wavelength.

A curve 191 corresponding to F10, which is a segment name according to the provisions of JIS, indicates a spectral distribution of a three band fluorescent lamp. The curve 191 has peaks at some wavelengths corresponding to visible light. The light of the fluorescent lamp indicated by the curve 191 contains a large quantity of visible light, but contains only small quantities of ultraviolet light and infrared light. Accordingly, the relative intensity P1 of the ultraviolet light to the visible light, and the relative intensity P2 of the infrared light to the visible light are substantially zero.

A curve 192 indicates the spectral distribution of sunlight. The curve 192 smoothly varies in the entirety. The components of sunlight indicated by the curve 192 are visible light, infrared light, and ultraviolet light in the descending order of the contained quantity. Accordingly, the relative intensity P2 of the infrared light to the visible light is larger than the relative intensity P1 of the ultraviolet light to the visible light.

A curve 193 indicates a spectral distribution of light of an incandescent lamp. The curve 193 linearly increases to the right side. In the light of an incandescent lamp indicated by the curve 193, light with a longer wavelength is contained by a larger quantity. That is, the light components of the incandescent lamp are infrared light, visible light, and ultraviolet light in the descending order of the contained quantity. Accordingly, the relative intensity P2 of the infrared light to the visible light is larger than the relative intensity P1 of the ultraviolet light to the visible light.

When comparing the relative intensities P1 and P2, it is expected that the ascending order of the relative intensity P1 of the ultraviolet light to the visible light is the fluorescent lamp, the incandescent lamp, and then sunlight, and the ascending order of the relative intensity P2 of the infrared light to the visible light is the fluorescent lamp, sunlight, and the incandescent lamp. The light source estimating device 21 uses the feature to estimate the light source.

As described above, the light source estimating device 21 receives the visible light, the infrared light, and the ultraviolet light, and obtains the relative intensity P1 of the ultraviolet light to the visible light, and the relative intensity P2 of the infrared light to the visible light, to estimate the light source.

By receiving the visible light, the infrared light, and the ultraviolet light, and then obtaining the relative intensities P1 and P2 to estimate the light source, the light source can be easily and reliably estimated.

Since the light source has been estimated only with the visible light component, a larger number of sensors had to be provided, or a larger number of procedures had to be performed so as to increase the accuracy of the light source estimation. Although the light source can be estimated only with the visible light component because the different types of light sources have different spectral characteristics in the wavelength range of the visible light, in such a case, the light quantity of light with many wavelengths of the visible light had to be obtained. Thus, the image pickup apparatus had to have a larger number of sensors, increasing the cost, and increasing the number of procedures for the estimation. If the number of sensors is reduced, the accuracy of the light source estimation may be reduced accordingly.

In contrast, the light source estimating device 21 uses the feature in which the different types of light sources have different ratios of the visible light, the infrared light, and the ultraviolet light, contained in radiated light. The light source estimating device 21 estimates the light source with the relative intensity P1 of the ultraviolet light to the visible light, and the relative intensity P2 of the infrared light to the visible light, thereby easily and reliably estimating the light source.

That is, the light source estimating device 21 has a simple configuration merely having the three sensors and uses not only the visible light, but also the invisible light, i.e., the ultraviolet light and the infrared light. In addition, the light source can be reliably estimated merely by using the measurement results of the three-color light with the sensors, and calculating the relative intensities of the infrared light and the ultraviolet light.

While the light quantities of the three-color light of the visible light, the infrared light, and the ultraviolet light are used to estimate the light source in the above description, one of the ultraviolet light and the infrared light may be used as the invisible light to estimate the light source.

Alternatively, light quantities of light in a plurality of wavelength ranges contained in a wavelength range of the visible light may be used to estimate the light source. In particular, for example, light quantities of light in wavelength ranges by the number of n (n is natural number), which include first to n-th wavelength ranges contained in the wavelength range of the visible light but not overlapped, are used to estimate the light source.

In such a case, a light source estimating device has, for example, a configuration in FIG. 12.

A light source estimating device 221 includes a photoreceptor 231, a visible light quantity calculator 232, an ultraviolet-to-visible ratio calculator 233, a given-color-to-visible ratio calculator 234-1 to a given-color-to-visible ratio calculator 234-$n$ (although given-color-to-visible ratio calculators 234-2 to 234-($n-1$) are not shown), an infrared-to-visible ratio calculator 235, an evaluating vector hold memory 236, and a light source estimator 237.

The photoreceptor 231 includes, for example, a sensor having a spectral sensitivity for ultraviolet light, a plurality of sensors having spectral sensitivities respectively for visible light in the first to n-th wavelength ranges contained in the wavelength range of the visible light, and a sensor having a spectral sensitivity for infrared light.

The photoreceptor 231 receives the ultraviolet light, the infrared light, and the light in the first to n-th wavelength ranges radiated from the light source, and photoelectrically converts the light. Accordingly, an ultraviolet light quantity (intensity) UV, light quantities (intensities) V1 to Vn in the first to n-th wavelength ranges of the visible light, and an infrared light quantity (intensity) IR are obtained. The photoreceptor 231 supplies the ultraviolet-to-visible ratio calculator 233 with the light quantity UV obtained through the photoelectric conversion, and supplies the infrared-to-visible ratio calculator 235 with the light quantity IR obtained through the photoelectric conversion.

Also, the photoreceptor 231 supplies the visible light quantity calculator 232 with the light quantities V1 to Vn obtained through the photoelectric conversion, and supplies the given-color-to-visible ratio calculators 234-1 to 234-n with the light quantities V1 to Vn, respectively.

Herein, the photoreceptor 231 has the sensors having the spectral sensitivities respectively for the light in the first to n-th wavelength ranges, instead of the visible light sensor 83 of the photoreceptor 51 in FIG. 3. In particular, the photoreceptor 231 has an ultraviolet sensor, an infrared sensor, and visible light sensors by the number of n.

The visible light quantity calculator 232 obtains the sum total of the light quantities V1 to Vn supplied from the photoreceptor 231, and supplies the ultraviolet-to-visible ratio calculator 233, the given-color-to-visible ratio calculators 234-1 to 234-n, and the infrared-to-visible ratio calculator 235, with the obtained sum total as a light quantity (intensity) V of the visible light.

The ultraviolet-to-visible ratio calculator 233 calculates a ratio of the ultraviolet light quantity UV to the visible light quantity V, that is, a relative intensity (relative light quantity) Q1 of the ultraviolet light to the visible light, on the basis of the light quantity UV supplied from the photoreceptor 231 and the light quantity V supplied from the visible light quantity calculator 232, and supplies the light source estimator 237 with the calculated value.

The given-color-to-visible ratio calculators 234-1 to 234-n calculate ratios of the light quantities V1 to Vn to the light quantity V of the visible light, that is, relative intensities (relative light quantities) Q2 to Q(n+1) of the light in the first to n-th wavelength ranges, on the basis of the light quantities V1 to Vn supplied from the photoreceptor 231 and the light quantity V supplied from the visible light quantity calculator 232, and supplies the light source estimator 237 with the calculated values.

Hereinafter, when the given-color-to-visible ratio calculators 234-1 to 234-n do not have to be distinguished from each other, each given-color-to-visible ratio calculator is merely referred to as a given-color-to-visible ratio calculator 234.

The infrared-to-visible ratio calculator 235 calculates the ratio of the infrared light quantity IR to the visible light quantity V, that is a relative intensity (relative light quantity) Q(n+2) of the infrared light to the visible light, on the basis of the light quantity IR supplied from the photoreceptor 231 and the light quantity V supplied from the visible light quantity calculator 232, and supplies the light source estimator 237 with the calculated value.

The evaluating vector hold memory 236 has an evaluating vector, which is composed of a relative intensity of the ultraviolet light to the visible light, relative intensities of the light in the first to n-th wavelength ranges to the visible light, and a relative intensity of the infrared light to the visible light, the evaluating vector being predetermined for each of a plurality of light sources. The evaluating vector hold memory 236 supplies the light source estimator 237 with a predetermined evaluating vector as desired.

The light source estimator 237 uses a vector, which is composed of the relative intensity Q1 supplied from the ultraviolet-to-visible ratio calculator 233, the relative intensities Q2 to Q(n+1) supplied from the given-color-to-visible ratio calculators 234-1 to 234-n, and the relative intensity Q(n+2) supplied from the infrared-to-visible ratio calculator 235, as a vector to be evaluated. The light source estimator 237 estimates the light source with the vector to be evaluated, and the evaluating vector stored in the evaluating vector hold memory 236, and outputs the estimated result to the image pickup apparatus 11.

The photoreceptor 231 may have a similar configuration to that of the photoreceptor 51 in FIG. 5. In such a case, for example, filters only transmitting light in the first to n-th wavelength ranges are arranged on the surface of the image pickup element 112-2.

For example, if n=3, and light in first to third wavelength ranges correspond to red (R), green (G), and blue (B) light, the filters in FIG. 6B are arranged on the surface of the image pickup element 112-2.

Referring to a flowchart in FIG. 13, the light source estimation processing with the light source estimating device 221 is described below.

In step S41, the photoreceptor 231 receives the visible light radiated from the light source and incident on the photoreceptor 231. In particular, the photoreceptor 231 receives the incident light in the first to n-th wavelength ranges, photoelectrically converts the light, thereby obtaining the light quantities V1 to Vn, supplies the visible light quantity calculator 232 with the light quantities V1 to Vn, and also supplies the given-color-to-visible ratio calculators 234-1 to 234-n with the light quantities V1 to Vn.

In step S42, the photoreceptor 231 receives the ultraviolet light radiated from the light source and incident on the photoreceptor 231, photoelectrically converts the light, thereby obtaining the ultraviolet light quantity UV, and supplies the ultraviolet-to-visible ratio calculator 233 with the light quantity UV.

In step S43, the photoreceptor 235 receives the infrared light radiated from the light source and incident on the photoreceptor 231, photoelectrically converts the light, thereby obtaining the infrared light quantity IR, and supplies the infrared-to-visible ratio calculator 235 with the light quantity IR.

To be more specific, the procedures in steps S41 to S43 are simultaneously performed by the photoreceptor 231.

In step S44, the visible light quantity calculator 232 calculates the visible light quantity V on the basis of the light quantities V1 to Vn supplied from the photoreceptor 231, and supplies the ultraviolet-to-visible ratio calculator 233, the given-color-to-visible ratio calculator 234, and the infrared-to-visible ratio calculator 235 with the calculated light quantity V. For example, the visible light quantity calculator 232 calculates the visible light quantity V by the following equation (3):

$$V = \sum_{i=1}^{n} Vi \qquad (3)$$

where, in the equation (3), Vi is a light quantity Vi in an i-th wavelength range (1≦i≦n), and E represents that each of numbers 1 to n is applied to a variable i of the light quantity Vi and the sum total of light quantities is obtained. Accordingly, the light quantity V is obtained by obtaining the sum total of the light quantities V1 to Vn.

In step S45, the ultraviolet-to-visible ratio calculator 233 calculates a relative intensity Q1 of the ultraviolet light to the visible light on the basis of the light quantity UV supplied from the photoreceptor 231 and the light quantity V supplied from the visible light quantity calculator 232, and supplies the light source estimator 237 with the calculated relative intensity Q1. For example, the ultraviolet-to-visible ratio calculator 233 calculates the relative intensity Q1 by the following equation (4):

$$Q1=UV/V \qquad (4),$$

where, in the equation (4), UV is the ultraviolet light quantity UV, and V is the visible light quantity V. Thus, the relative intensity Q1 is obtained by dividing the light quantity UV by the light quantity V.

In step S46, the given-color-to-visible ratio calculator 234 calculates a relative intensity Q(i+1) of the light in the i-th wavelength range to the visible light on the basis of the light quantity Vi ($1 \leq i \leq n$) supplied from the photoreceptor 231 and the light quantity V supplied from the visible light quantity calculator 232, and supplies the light source estimator 237 with the calculated relative intensity Q(i+1). That is, the given-color-to-visible ratio calculators 234-1 to 234-n respectively calculates relative intensities Q2 to Q(n+1), and supply the light source estimator 237 with the calculated values.

For example, the given-color-to-visible ratio calculator 234 calculates the relative intensity Q(i+1) by the following equation (5):

$$Q(i+1)=Vi/V \qquad (5),$$

where, in the equation (5), Vi is the light quantity Vi of the light in the i-th wavelength range, and V is the visible light quantity V. Thus, the relative intensity Q(i+1) is obtained by dividing the light quantity Vi by the light quantity V.

In step S47, the infrared-to-visible ratio calculator 235 calculates a relative intensity Q(n+2) of the infrared light to the visible light on the basis of the light quantity IR supplied from the photoreceptor 231 and the light quantity V supplied from the visible light quantity calculator 232, and supplies the light source estimator 237 with the calculated relative intensity Q(n+2). For example, the infrared-to-visible ratio calculator 235 calculates the relative intensity Q(n+2) by the following equation (6):

$$Q(n+2)=IR/V \qquad (6),$$

where, in the equation (6), IR is the infrared light quantity IR, and V is the visible light quantity V. Thus, the relative intensity Q(n+2) is obtained by dividing the light quantity IR by the light quantity V.

In step S48, the light source estimator 237 uses the vector to be evaluated, which is composed of the relative intensity Q1 supplied from the ultraviolet-to-visible ratio calculator 233, the relative intensities Q2 to Q(n+1) supplied from the given-color-to-visible ratio calculators 234-1 to 234-n, and the relative intensity Q(n+2) supplied from the infrared-to-visible ratio calculator 235, and the evaluating vector stored in the evaluating vector hold memory 236. The light source estimator 237 outputs the estimated result, and the light source estimation processing is completed.

For example, the light source estimator 237 calculates a similarity between the vector to be evaluated and the evaluating vector for each light source, and determines the light source indicated by the evaluating vector having the highest similarity as the light source obtained through the result of the light source estimation.

As described above, the light source estimating device 221 receives the light in the first to n-th wavelength ranges as the visible light, the infrared light, and the ultraviolet light, and obtains the relative intensity Q1 of the ultraviolet light to the visible light, the relative intensity Q(i+1) of the light in the i-th wavelength range ($1 \leq i \leq n$) to the visible light, and the relative intensity Q(n+2) of the infrared light to the visible light, to estimate the light source.

By obtaining the relative intensities Q1 to Q(n+2) to estimate the light source, the light source can be easily and reliably estimated. In particular, since the light source estimating device 221 uses the light quantity of the invisible light as well as the light quantities of the visible light in the plurality of wavelength ranges, the light source can be estimated by using the spectral characteristics in the wavelength range of the visible light contained in the light from the light source. Accordingly, for example, when the light source is a fluorescent lamp shown in FIG. 9, that is, a fluorescent lamp of one of various types having different peak wavelengths in the spectral distributions, the light source can be reliably estimated.

In the above description, while the relative intensity of light other than the visible light to the visible light is used to estimate the light source, light quantities may be normalized to estimate the light source.

Figure 14:
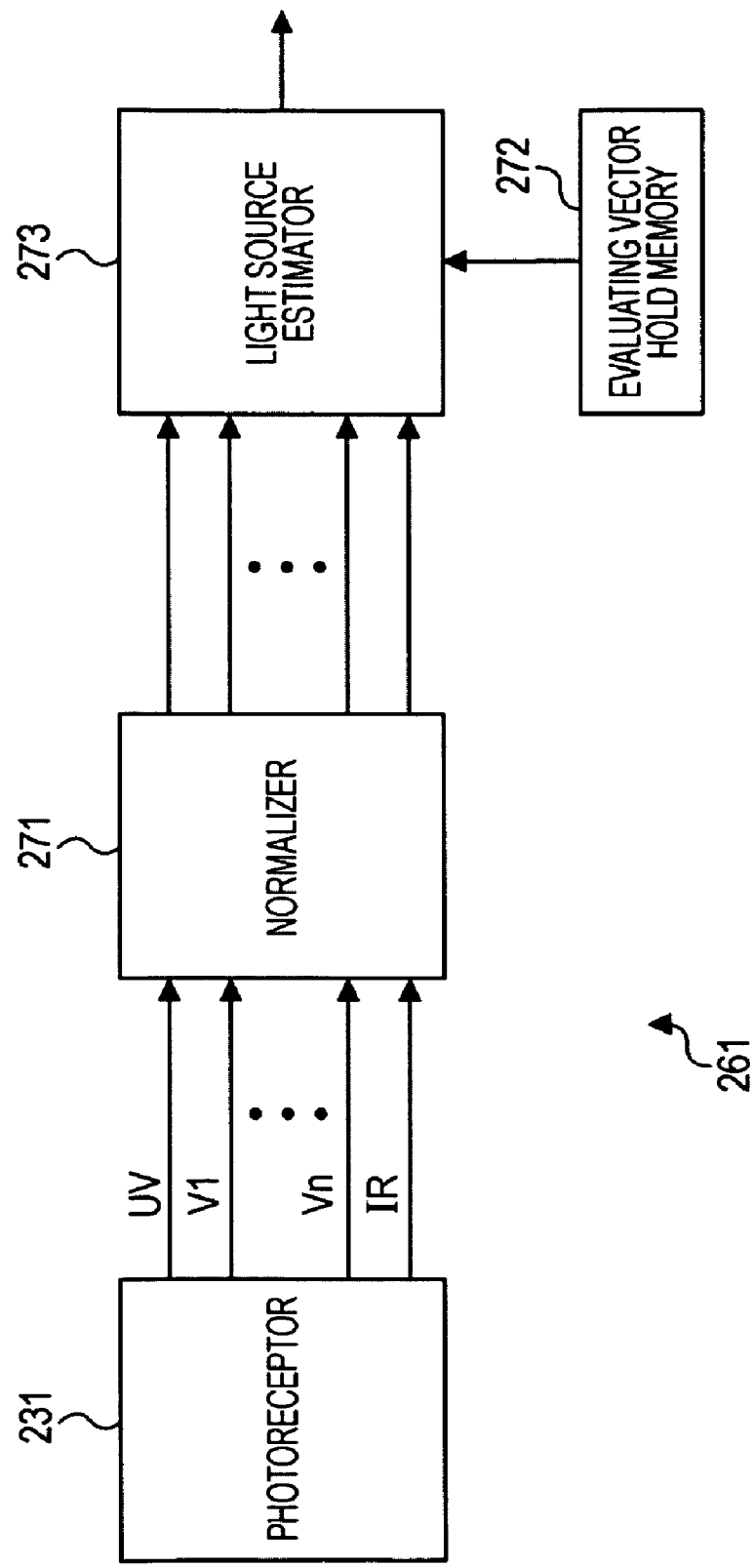
FIG. 14 is a block diagram showing still another example configuration of a light source estimating device.

In such a case, the light source estimating device has, for example, a configuration in FIG. 14. In FIG. 14, like reference numerals refer like components in FIG. 12, and description thereof is omitted.

A light source estimating device 261 includes the photoreceptor 231, a normalizer 271, an evaluating vector hold memory 272, and a light source estimator 273.

The normalizer 271 normalizes the ultraviolet light quantity UV, the light quantities V1 to Vn of the light in the first to n-th wavelength ranges, and the light quantity IR of the infrared light, supplied from the photoreceptor 231, and supplies the light source estimator 273 with the normalized values.

The evaluating vector hold memory 272 has an evaluating vector, which is composed of a normalized ultraviolet light quantity, normalized light quantities of light in the first to n-th wavelength ranges, and a normalized infrared light quantity, predetermined for each of a plurality of light sources. The evaluating vector hold memory 272 supplies the light source estimator 273 with a predetermined evaluating vector as desired.

The light source estimator 273 uses a vector to be evaluated, which is composed of the normalized light quantity UV, light quantities V1 to Vn, and light quantity IR, supplied from the normalizer 271, and the evaluating vector stored in the evaluating vector hold memory 272 to estimate the light source, and outputs the estimated result to the image pickup apparatus 11.

Referring to a flowchart in FIG. 15, the light source estimation processing with the light source estimating device 261 is described below. Procedures in steps S71 to S73 are similar to those in steps S41 to S43 in FIG. 13, and hence, description thereof is omitted.

When the photoreceptor 231 supplies the normalizer 271 with the light quantity UV, light quantities V1 to Vn, and light quantity IR through the procedures in steps S71 to S73, in step S74, the normalizer 271 normalizes the light quantities supplied from the photoreceptor 231, and supplies the light source estimator 273 with the normalized values.

For example, the normalizer 271 normalizes the light quantities such that the light quantities supplied from the photoreceptor 231 each are divided by the sum of the light quantities. In this case, the normalizer 271 obtains the sum total A of the light quantities by the following equation (7):

$$A = \left(\sum_{i=1}^{n} Vi\right) + UV + IR \qquad (7)$$

where, in the equation (7), Vi is a light quantity Vi in the i-th wavelength range ($1 \leq i \leq n$), $\Sigma$ represents that each of numbers 1 to n is applied to a variable i of the light quantity Vi and the sum total of light quantities is obtained, UV is the ultraviolet light quantity UV, and IR is the infrared light quantity IR. Thus, the sum total A of the light quantities is obtained by adding the light quantities V1 to Vn, light quantity UV and light quantity IR.

Then, the normalizer 271 normalizes the light quantity UV by dividing the ultraviolet light quantity UV by the sum total A of the light quantities, normalizes the light quantity Vi by dividing the light quantity Vi of the light in the i-th wavelength range by the sum total A of the light quantities, and normalizes the light quantity IR by dividing the infrared light quantity IR by the sum total A of the light quantities. In particular, to obtain a normalized ultraviolet light quantity W1, a normalized light quantity W(i+1) of light in the i-th wavelength range, and a normalized infrared light quantity W(n+2), the normalizer 271 calculates the following equations (8) to (10):

$$W1 = UV/A \qquad (8),$$

$$W(i+1) = Vi/A \qquad (9), \text{ and}$$

$$W(n+2) = IR/A \qquad (10),$$

where, in the equations (8) to (10), A is the sum total A of the light quantities, UV is the ultraviolet light quantity UV, Vi is the light quantity Vi of the light in the i-th wavelength range, and IR is the infrared light quantity IR.

The normalized ultraviolet light quantity W1, the normalized light quantity W(i+1) of the light in the i-th wavelength range, and the normalized infrared light quantity W(n+2) are obtained as described above, and then, the normalizer 271 supplies the light source estimator 273 with the obtained light quantities.

In step S75, the light source estimator 273 uses a vector to be evaluated, which is composed of the relative intensities W1 to W(n+2) supplied from the normalizer 271, and an evaluating vector, which is stored in the evaluating vector hold memory 272, to estimate the light source. The light source estimator 273 outputs the estimated result, and then the light source estimation processing is completed.

For example, the light source estimator 273 calculates a similarity between the vector to be evaluated and the evaluating vector for each light source, and determines the light source indicated by the evaluating vector having the highest similarity as the light source obtained through the result of the light source estimation.

As described above, the light source estimator 273 receives the light in the first to n-th wavelength ranges as the visible light, the infrared light, and the ultraviolet light, and normalizes the received light quantities, to estimate the light source.

By obtaining the normalized light quantities W1 to W(n+2) to estimate the light source, the light source can be easily and reliably estimated. In particular, since the light source estimator 273 normalizes each of the light quantities by dividing the each of the light quantities by the sum of the light quantities of the received light in all wavelength ranges, the relative light quantities of the ultraviolet light, the visible light from the light source in the wavelengths ranges by the number of n, and the infrared light over the entire spectral distribution of the light from the light source can be obtained as the normalized light quantities. Accordingly, the spectral characteristics of the light in all wavelength ranges including not only the visible light, but also the invisible light, can be considered to estimate the light source.

As described above, by using the visible light quantity and the invisible light quantity to estimate the light source, the type of the light source in the capturing environment can be reliably estimated with a simple configuration, that is, with the cost and the number of procedures reduced.

The above-described processing may be executed by hardware or software. If the processing is executed by software, a program constituting the software is stored in special-purpose hardware of a computer, or is installed from a program recording medium into, for example, a general-purpose personal computer capable of executing various functions through installation of various programs.

Figure 16:
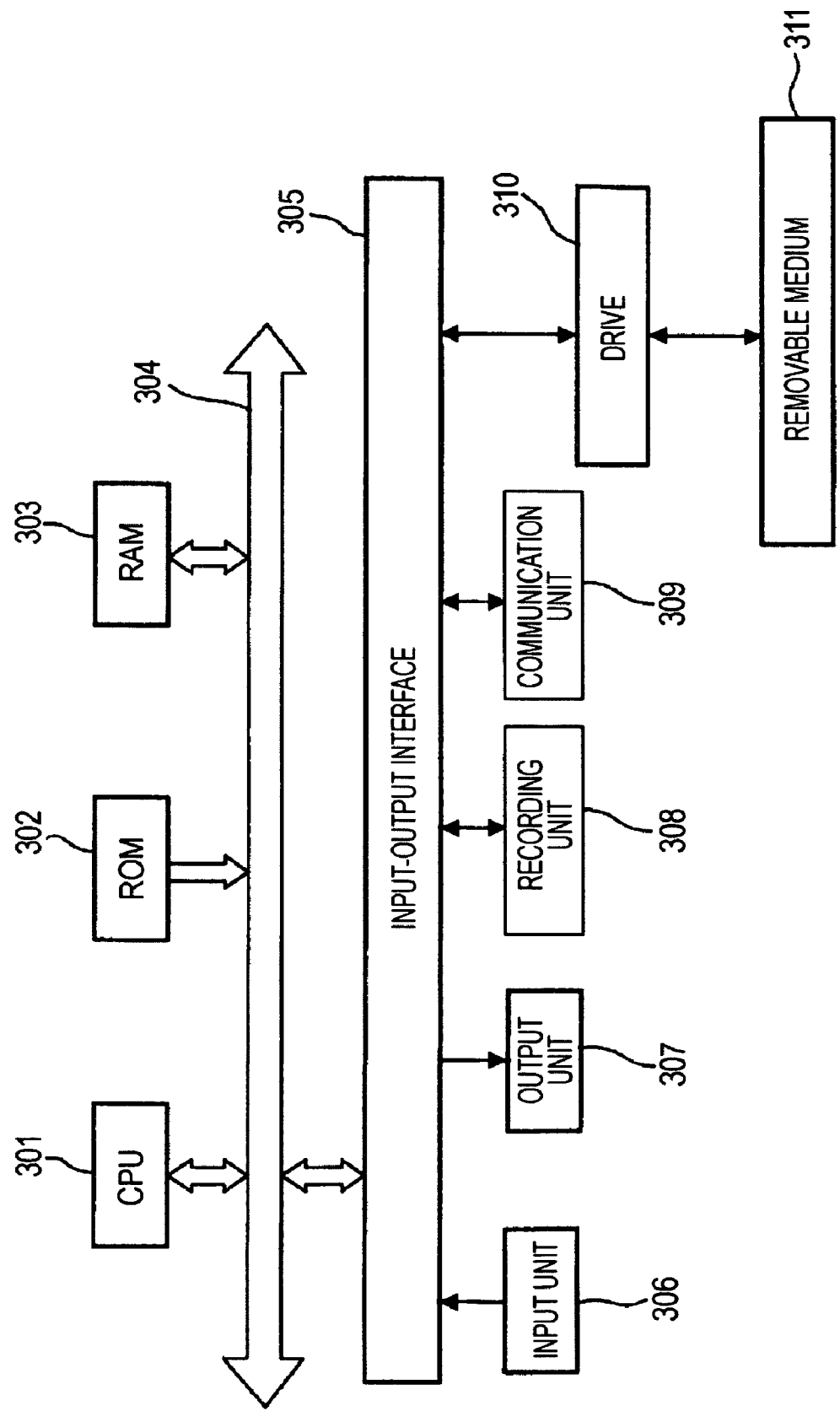
FIG. 16 is a block diagram showing an example configuration of a computer.

FIG. 16 is a block diagram showing an example configuration of hardware of a computer which executes the above-described processing through a program.

In such a computer, a central processing unit (CPU) 301, a read only memory (ROM) 302, and a random access memory (RAM) 303 are connected to each other through a bus 304.

Also, the bus 304 is connected to an input-output interface 305. The input-output interface 305 is connected to an input unit 306 including a keyboard, a mouse, a microphone, a sensor for receiving and photoelectrically converting light with a wavelength, and the like; an output unit 307 including a display, a speaker, and the like; a recording unit 308 including a hard disk, a nonvolatile memory, and the like; a communication unit 309 including a network interface, and the like; and a drive 310 which drives a removable medium 311 such as a magnetic disk, an optical disk, a magneto-optical disk, or a semiconductor memory.

The sensor as the input unit 306 has, for example, a configuration similar to that of the photoreceptor 51 in FIG. 2, so as to receive the ultraviolet light, the visible light, and the infrared light, and output the light quantities of the received light.

In the above-described computer, the CPU 301 loads the program, for example, stored in the recording unit 308, into the RAM 303 through the input-output interface 305 and the bus 304, and executes the program, thereby performing the above-described processing.

The program executed by the computer (CPU 301) is stored in the removable medium 311, such as a magnetic disk (containing flexible disk), an optical disk (compact disc-read only memory (CD-ROM), a digital versatile disc (DVD), or the like), a magneto-optical disk, or a package medium including a semiconductor memory, or is provided through a wired or wireless transmission medium, such as a local area network, Internet, or digital satellite broadcasting.

The removable medium 311 may be mounted on the drive 310 and the program may be installed in the recording unit 308 through the input-output interface 305. Alternatively, the program may be received by the communication unit 309 through the wired or wireless transmission medium, and installed in the recording unit 308. Still alternatively, the program may be previously installed in the ROM 302 or the recording unit 308.

The program executed by the computer may be a program successively processing the steps in the order described in the specification, or a program processing steps in parallel, at a desired timing, or at reception of a call.

Embodiments of the invention are not limited to those described above, and various modifications can be made within the scope of the invention.

What is claimed is:

1. A light source estimating device comprising:
   light receiving means for receiving visible light and invisible light radiated from a light source,
   light source estimating means for estimating a type of the light source on the basis of an intensity of the received visible light and an intensity of the received invisible light,
   wherein the light receiving means includes
   visible light receiving means having a spectral sensitivity for visible light and receiving the visible light radiated from the light source,
   ultraviolet light receiving means having a spectral sensitivity for ultraviolet light and receiving ultraviolet light radiated from the light source, and
   infrared light receiving means having a spectral sensitivity for infrared light and receiving infrared light radiated from the light source,
   further comprising:
   first relative intensity calculating means for calculating a relative intensity of the ultraviolet light to the visible light on the basis of the intensity of the received visible light and the intensity of the received ultraviolet light; and
   second relative intensity calculating means for calculating a relative intensity of the infrared light to the visible light on the basis of the intensity of the received visible light and the intensity of the received infrared light,
   wherein the light source estimating means estimates the type of the light source on the basis of the relative intensity calculated by the first relative intensity calculating means and the relative intensity calculated by the second relative intensity calculating means.

2. A light source estimating device comprising:
   light receiving means for receiving visible light and invisible light radiated from a light source,
   light source estimating means for estimating a type of the light source on the basis of an intensity of the received visible light and an intensity of the received invisible light,
   wherein the light receiving means receives light in a plurality of wavelength ranges contained in a wavelength range of visible light, and
   wherein the light source estimating means estimates the type of the light source on the basis of intensities of the received light in the plurality of wavelength ranges, and the intensity of the received invisible light,
   visible light intensity calculating means for calculating a sum of the intensities of the received light in the plurality of wavelength ranges as the intensity of the visible light;
   first relative intensity calculating means for calculating a relative intensity of the invisible light to the visible light on the basis of the intensity of the visible light and the intensity of the invisible light; and
   second relative intensity calculating means for calculating relative intensities of the light in the plurality of wavelength ranges to the visible light on the basis of the intensity of the visible light and the intensities of the light in the plurality of wavelength ranges,
   wherein the light source estimating means estimates the type of the light source on the basis of the relative intensity calculated by the first relative intensity calculating means and the relative intensities calculated by the second relative intensity calculating means.

3. A light source estimating device comprising:
   light receiving means for receiving visible light and invisible light radiated from a light source,
   light source estimating means for estimating a type of the light source on the basis of an intensity of the received visible light and an intensity of the received invisible light,
   wherein the light receiving means receives light in a plurality of wavelength ranges contained in a wavelength range of visible light, and
   wherein the light source estimating means estimates the type of the light source on the basis of intensities of the received light in the plurality of wavelength ranges, and the intensity of the received invisible light,
   normalizing means for calculating a sum of intensities of the received light in the plurality of wavelength ranges as the intensity of the visible light, and normalizing the intensities of the light in the plurality of wavelength ranges and the intensity of the invisible light on the basis of the calculated intensity of the visible light,
   wherein the light source estimating means estimates the type of the light source on the basis of the normalized intensities of the light in the plurality of wavelength ranges and the normalized intensity of the invisible light.

4. A light source estimating method comprising the steps of:
   controlling reception of visible light and invisible light radiated from a light source,
   estimating a type of the light source on the basis of an intensity of the received visible light and an intensity of the received invisible light,
   photoelectrically converting the light,
   wherein the step of controlling reception includes the steps of
   having a spectral sensitivity for visible light and receiving the visible light radiated from the light source,
   having a spectral sensitivity for ultraviolet light and receiving ultraviolet light radiated from the light source, and
   having a spectral sensitivity for infrared light and receiving infrared light radiated from the light source,
   further comprising the steps of:
   calculating a relative intensity of the ultraviolet light to the visible light on the basis of the intensity of the received visible light and the intensity of the received ultraviolet light; and
   calculating a relative intensity of the infrared light to the visible light on the basis of the intensity of the received visible light and the intensity of the received infrared light,
   wherein the step of estimating the type of the light source estimates the type of the light source on the basis of the relative intensity calculated by the step of calculating the ultraviolet light to the visible light and the relative intensity calculated by the step of calculating a relative intensity of the infrared light to the visible light.

5. A computer executable program comprising the steps of:
   controlling reception of visible light and invisible light radiated from a light source,
   estimating a type of the light source on the basis of an intensity of the received visible light and an intensity of the received invisible light;
   photoelectrically converting the light,
   wherein the step of controlling reception includes the steps of
   having a spectral sensitivity for visible light and receiving the visible light radiated from the light source, having a spectral sensitivity for ultraviolet light and receiving ultraviolet light radiated from the light source, and having a spectral sensitivity for infrared light and receiving infrared light radiated from the light source, further comprising the steps of:

calculating a relative intensity of the ultraviolet light to the visible light on the basis of the intensity of the received visible light and the intensity of the received ultraviolet light; and calculating a relative intensity of the infrared light to the visible light on the basis of the intensity of the received visible light and the intensity of the received infrared light, wherein the step of estimating the type of the light source estimates the type of the light source on the basis of the relative intensity calculated by the step of calculating the ultraviolet light to the visible light and the relative intensity calculated by the step of calculating a relative intensity of the infrared light to the visible light.

6. A light source estimating device comprising:

a light receiving section receiving visible light and invisible light radiated from a light source, a light source estimating section estimating a type of the light source on the basis of an intensity of the received visible light and an intensity of the received invisible light, photoelectrically converting section photoelectrically converting the light, wherein the light receiving section includes visible light receiving section having a spectral sensitivity for visible light and receiving the visible light radiated from the light source, ultraviolet light receiving section having a spectral sensitivity for ultraviolet light and receiving ultraviolet light radiated from the light source, and infrared light receiving section having a spectral sensitivity for infrared light and receiving infrared light radiated from the light source, further comprising:

first relative intensity calculating section for calculating a relative intensity of the ultraviolet light to the visible light on the basis of the intensity of the received visible light and the intensity of the received ultraviolet light; and second relative intensity calculating section for calculating a relative intensity of the infrared light to the visible light on the basis of the intensity of the received visible light and the intensity of the received infrared light, wherein the light source estimating section estimates the type of the light source on the basis of the relative intensity calculated by the first relative intensity calculating section and the relative intensity calculated by the second relative intensity calculating section.

7. A light source estimating method comprising the steps of:

receiving visible light and invisible light radiated from a light source, estimating a type of the light source on the basis of an intensity of the received visible light and an intensity of the received invisible light wherein the step of receiving visible and invisible light receives light in a plurality of wavelength ranges contained in a wavelength range of visible light, and wherein the step of estimating the type of the light source estimates the type of the light source on the basis of intensities of the received light in the plurality of wavelength ranges, and the intensity of the received invisible light, calculating a sum of the intensities of the received light in the plurality of wavelength ranges as the intensity of the visible light;

calculating a relative intensity of the invisible light to the visible light on the basis of the intensity of the visible light and the intensity of the invisible light; and calculating relative intensities of the light in the plurality of wavelength ranges to the visible light on the basis of the intensity of the visible light and the intensities of the light in the plurality of wavelength ranges, wherein the step for estimating the type of light source estimates the type of the light source on the basis of the relative intensity calculated by the step of calculating the relative intensity of invisible light to the visible light and the relative intensities calculated by the step of calculating the relative intensities of the light in the plurality of wavelength ranges to the visible light.

8. A light source estimating method comprising the steps of:

receiving visible light and invisible light radiated from a light source, estimating a type of the light source on the basis of an intensity of the received visible light and an intensity of the received invisible light wherein the step of receiving visible and invisible light receives light in a plurality of wavelength ranges contained in a wavelength range of visible light, and wherein the step of estimating the type of the light source estimates the type of the light source on the basis of intensities of the received light in the plurality of wavelength ranges, and the intensity of the received invisible light, calculating a sum of intensities of the received light in the plurality of wavelength ranges as the intensity of the visible light, and normalizing the intensities of the light in the plurality of wavelength ranges and the intensity of the invisible light on the basis of the calculated intensity of the visible light, wherein the step of estimating the type of the light source estimates the type of the light source on the basis of the normalized intensities of the light in the plurality of wavelength ranges and the normalized intensity of the invisible light.

9. A computer executable program comprising the steps of:

receiving visible light and invisible light radiated from a light source, estimating a type of the light source on the basis of an intensity of the received visible light and an intensity of the received invisible light wherein the step of receiving visible and invisible light receives light in a plurality of wavelength ranges contained in a wavelength range of visible light, and wherein the step of estimating the type of light source estimates the type of the light source on the basis of intensities of the received light in the plurality of wavelength ranges, and the intensity of the received invisible light, calculating a sum of the intensities of the received light in the plurality of wavelength ranges as the intensity of the visible light;

calculating a relative intensity of the invisible light to the visible light on the basis of the intensity of the visible light and the intensity of the invisible light; and calculating relative intensities of the light in the plurality of wavelength ranges to the visible light on the basis of the intensity of the visible light and the intensities of the light in the plurality of wavelength ranges, wherein the step for estimating the type of light source estimates the type of the light source on the basis of the relative intensity calculated by the step of calculating the relative intensity of invisible light to the visible light and the relative intensities calculated by the step of calculating the relative intensities of the light in the plurality of wavelength ranges to the visible light.

10. A computer executable program comprising the steps of:

receiving visible light and invisible light radiated from a light source, estimating a type of the light source on the basis of an intensity of the received visible light and an intensity of the received invisible light wherein the step of receiving visible and invisible light receives light in a plurality of wavelength ranges contained in a wavelength range of visible light, and wherein the step of estimating the type of the light source estimates the type of the light source on the basis of intensities of the received light in the plurality of wavelength ranges, and the intensity of the received invisible light, calculating a sum of intensities of the received light in the plurality of wavelength ranges as the intensity of the visible light, and normalizing the intensities of the light in the plurality of wavelength ranges and the intensity of the invisible light on the basis of the calculated intensity of the visible light, wherein the step of estimating the type of the light source estimates the type of the light source on the basis of the normalized intensities of the light in the plurality of wavelength ranges and the normalized intensity of the invisible light.

11. A light source estimating device comprising:

light receiving section receiving visible light and invisible light radiated from a light source, light source estimating section estimating a type of the light source on the basis of an intensity of the received visible light and an intensity of the received invisible light wherein the light receiving section receives light in a plurality of wavelength ranges contained in a wavelength range of visible light, and wherein the light source estimating section estimates the type of the light source on the basis of intensities of the received light in the plurality of wavelength ranges, and the intensity of the received invisible light, visible light intensity calculating section calculating a sum of the intensities of the received light in the plurality of wavelength ranges as the intensity of the visible light;

first relative intensity calculating section calculating a relative intensity of the invisible light to the visible light on the basis of the intensity of the visible light and the intensity of the invisible light; and second relative intensity calculating section calculating relative intensities of the light in the plurality of wavelength ranges to the visible light on the basis of the intensity of the visible light and the intensities of the light in the plurality of wavelength ranges, wherein the light source estimating section estimates the type of the light source on the basis of the relative intensity calculated by the first relative intensity calculating section and the relative intensities calculated by the second relative intensity calculating section.

12. A light source estimating device comprising:

light receiving section receiving visible light and invisible light radiated from a light source, light source estimating section estimating a type of the light source on the basis of an intensity of the received visible light and an intensity of the received invisible light wherein the light receiving section receives light in a plurality of wavelength ranges contained in a wavelength range of visible light, and wherein the light source estimating section estimates the type of the light source on the basis of intensities of the received light in the plurality of wavelength ranges, and the intensity of the received invisible light, normalizing section calculating a sum of intensities of the received light in the plurality of wavelength ranges as the intensity of the visible light, and normalizing the intensities of the light in the plurality of wavelength ranges and the intensity of the invisible light on the basis of the calculated intensity of the visible light, wherein the light source estimating section estimates the type of the light source on the basis of the normalized intensities of the light in the plurality of wavelength ranges and the normalized intensity of the invisible light.

* * * * *